US012774989B2

(12) United States Patent
Ould et al.

(10) Patent No.: US 12,774,989 B2

(45) Date of Patent: Oct. 27, 2026

(54) ULTRASOUND INSPECTION PROBE AND CORRESPONDING INSPECTION METHOD

(71) Applicant: RENISHAW PLC, Wotton-under-Edge (GB)

(72) Inventors: John Charles Ould, Wotton-under-Edge (GB); Thomas Phillip Handford, Wotton-under-Edge (GB); Robert Toth, Wotton-under-Edge (GB); Christopher James Ratford, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 251 days.

(21) Appl. No.: 18/835,089

(22) PCT Filed: Feb. 6, 2023

(86) PCT No.: PCT/GB2023/050255

§ 371 (c)(1),
(2) Date: Aug. 1, 2024

(87) PCT Pub. No.: WO2023/152474

PCT Pub. Date: Aug. 17, 2023

(65) Prior Publication Data

US 2025/0130203 A1 Apr. 24, 2025

(30) Foreign Application Priority Data

Feb. 9, 2022 (EP) .................................... 22155920
Apr. 5, 2022 (EP) .................................... 22166792

(51) Int. Cl.

*G01N 29/04* (2006.01)
*G01B 17/02* (2006.01)
*G01N 29/265* (2006.01)

(52) U.S. Cl.

CPC ............ *G01N 29/04* (2013.01); *G01B 17/02* (2013.01); *G01N 29/265* (2013.01); *G01N 2291/0289* (2013.01)

(58) Field of Classification Search

CPC ................ G01N 29/04; G01N 29/265; G01N 2291/0289; G01B 17/02

See application file for complete search history.

(56) References Cited

U.S. PATENT DOCUMENTS 3,821,834 A 7/1974 McElroy
3,921,442 A 11/1975 Soloway (Continued)

FOREIGN PATENT DOCUMENTS

CN 105157630 A 12/2015
DE 102 62 188 B4 5/2010

(Continued)

OTHER PUBLICATIONS

Sep. 1, 2022 extended Search Report issued in European Patent Application No. 22166792.6.

(Continued)

*Primary Examiner* — Toan N Pham

(74) *Attorney, Agent, or Firm* — Oliff PLC

(57) ABSTRACT

An ultrasound inspection probe is described for use with a coordinate positioning apparatus, such as a machine tool. The probe includes a probe body for mounting to a coordinate positioning apparatus and an elongate member extending from the probe body. The elongate member includes an ultrasound transducer assembly and a datum surface at its distal end. A movable joint connects a proximal end of the elongate member to the probe body and this movable joint is configured to permit both lateral and rotational movement of the proximal end of the elongate member relative to the probe body such that the elongate member can rotate about (Continued)

Figure 1:
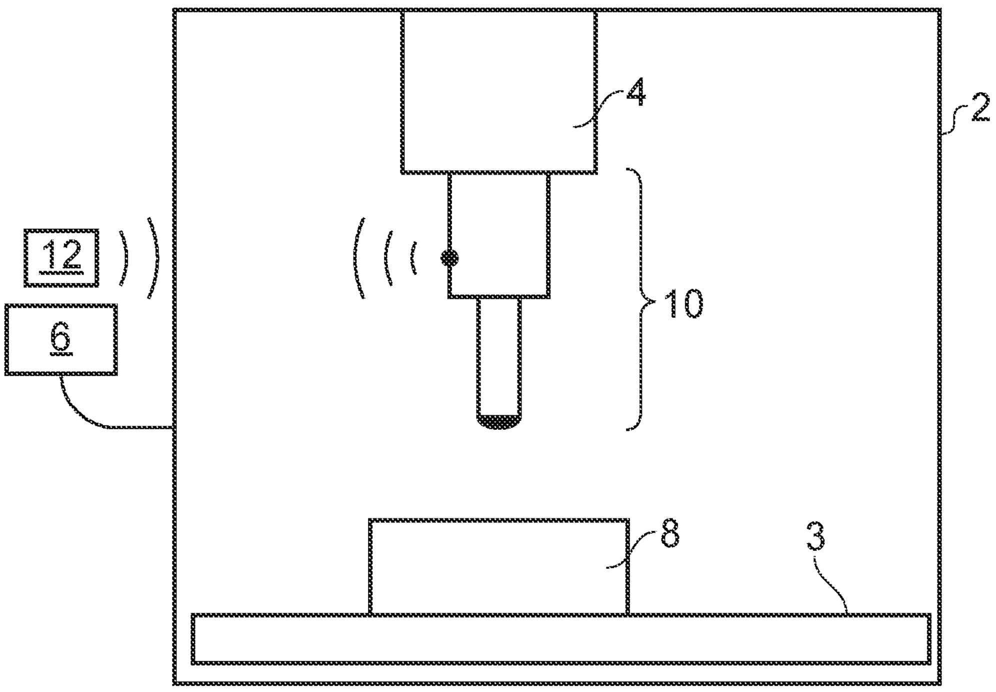

its distal end to allow the datum surface to angularly align with a surface of an object to be inspected. In this manner, the datum surface aligns with the surface of the object being inspected to optimise acoustic coupling.

15 Claims, 9 Drawing Sheets

(56) References Cited

U.S. PATENT DOCUMENTS

| | | | | |
|---|---|---|---|---|
| 4,153,998 | A | 5/1979 | McMurtry | |
| 4,270,275 | A | 6/1981 | McMurtry | |
| 4,596,143 | A | 6/1986 | Norel | |
| 5,146,691 | A | 9/1992 | McMurtry | |
| 5,212,872 | A | 5/1993 | Spivey et al. | |
| 5,253,428 | A | 10/1993 | McMurtry | |
| 5,353,514 | A | 10/1994 | McMurtry | |
| 5,491,904 | A | 2/1996 | McMurtry | |
| 5,669,152 | A | 9/1997 | McMurtry | |
| 7,891,248 | B2 | 2/2011 | Hough et al. | |
| 8,191,422 | B2 | 6/2012 | Maruyama et al. | |
| 8,196,471 | B2 * | 6/2012 | Han | A61B 8/12 73/620 |
| 8,381,591 | B2 * | 2/2013 | Maev | G01N 29/221 73/588 |
| 8,683,882 | B2 * | 4/2014 | Jackson | G01N 29/265 73/866.5 |
| 10,502,712 | B2 | 12/2019 | Hall | |
| 11,231,398 | B2 | 1/2022 | Hall | |
| 11,885,771 | B2 | 1/2024 | Hall | |
| 12,266,556 | B2 * | 4/2025 | Tarabulski | G05B 19/402 |
| 2009/0165317 | A1 | 7/2009 | Little | |
| 2009/0178482 | A1 | 7/2009 | Hough et al. | |
| 2009/0288490 | A1 | 11/2009 | Maruyama et al. | |
| 2010/0205816 | A1 | 8/2010 | Wu et al. | |
| 2010/0218590 | A1 | 9/2010 | Foisy | |
| 2013/0074601 | A1 | 3/2013 | Jackson | |
| 2014/0260627 | A1 | 9/2014 | Ferrari et al. | |
| 2017/0276651 | A1 | 9/2017 | Hall | |
| 2017/0284971 | A1 | 10/2017 | Hall | |
| 2022/0178685 | A1 | 6/2022 | Seitz et al. | |
| 2022/0178885 | A1 | 6/2022 | Hall | |

FOREIGN PATENT DOCUMENTS

| | | | |
|---|---|---|---|
| EP | 0 551 164 | A1 | 7/1993 |
| EP | 2 487 455 | A1 | 8/2012 |
| GB | 2 461 864 | A | 1/2010 |
| JP | 2003-000592 | A | 1/2003 |
| WO | 2004/057552 | A1 | 7/2004 |
| WO | 2005/057205 | A1 | 6/2005 |
| WO | 2007/028941 | A1 | 3/2007 |
| WO | 2008/012535 | A2 | 1/2008 |
| WO | 2010/020940 | A1 | 2/2010 |
| WO | 2016/051147 | A1 | 4/2016 |
| WO | 2016/051148 | A1 | 4/2016 |
| WO | 2021/038106 | A1 | 3/2021 |

OTHER PUBLICATIONS

Apr. 28, 2023 International Search Report issued in International Patent Application No. PCT/GB2023/050255.

Apr. 28, 2023 Written Opinion of the International Searching Authority issued in International Patent Application No. PCT/GB2023/050255.

Orchard, N. et al., "The Design, Calibration and Use of An Ultrasonic Probe on a CMM," 2006.

Lian, M. et al., "Ultrasonic on-machine scanning for thickness measurement of thin-walled parts: modeling and experiments," The International Journal of Advanced Manufacturing Technology, 2019, vol. 104, pp. 2061-2072.

"Ultrasonic Transducers," The Ultran Group, 32 pp, 2018.

Jul. 25, 2022 extended Search Report issued in European Patent Application No. 22155920.6.

Apr. 28, 2023 International Search Report issued in International Patent Application No. PCT/GB2023/050254.

Apr. 28, 2023 Written Opinion of the International Searching Authority issued in International Patent Application No. PCT/GB2023/050254.

U.S. Appl. No. 18/835,098, filed Aug. 1, 2024 in the name of Ould, J.C. et al.

* cited by examiner

ULTRASOUND INSPECTION PROBE AND CORRESPONDING INSPECTION METHOD

The present invention relates to an ultrasound inspection probe for use on a coordinate positioning apparatus, such as a machine tool. In particular, the present invention relates to an ultrasound measurement probe having an improved movable joint for aligning the ultrasound transducer with the surface of an object being inspected.

Ultrasound measurement devices that can be mounted to coordinate positioning apparatus, such as machine tool and coordinate measuring machines (CMMs), are known. Such devices allow automated ultrasound measurements, for example to measure the thickness of an object or to identify flaws within an object.

US2009/0178482 describes a coordinate measuring machine (CMM) that is arranged to carry an ultrasound test probe for measuring the thickness of objects. As shown in FIG. 2 of US2009/0178482, the test probe is secured to an indexable probe head of the CMM by a connector. The test probe also includes a pair of gimbal mechanisms located near the ultrasound (delay line) transducer. The gimbal mechanisms allow the angular alignment of the ultrasound transducer to vary relative to the probe head so that it can self-align with the surface of the object to be inspected. This self-alignment to the surface of the object allows the test probe to measure object wall thickness along a line perpendicular to the surface thereby maximising the ultrasound return signal. US2013/0074601 describes an ultrasound measurement device having a spherical bearing that allows the face of ultrasound transducer element to self-align with the surface of a test object.

WO2016/051147 describes an alternative arrangement in which an ultrasound probe is attached to a CMM by a two-axis rotary head. The two-axis head allows fine adjustment of the angle of the ultrasound probe relative to the surface of the object in real time thereby allowing the ultrasound return signal to be maximised.

WO2021/038106 describes a wireless ultrasonic measurement probe for use with a CNC machine tool. In one embodiment, the device includes a tubular sleeve having an elastic carrier element protruding slightly from its distal end. The elastic carrier element is deformable such that when the device is pressed into engagement with a surface the distal end of the elastic carrier element deforms and displaces until it becomes flush with the end of the tubular sleeve. The tubular sleeve is also linearly movable (i.e., back and forth along the linear axis of the tubular sleeve) relative to the base of the measurement probe. A sensor is provided to detect such linear motion and thereby indicate when the distal end of the tubular sleeve has been engaged with an object to be inspected.

A variety of other, non-ultrasound based, measurement devices are also used for the automated inspection of objects using coordinate positioning apparatus. For example, U.S. Pat. Nos. 4,153,998, 5,146,691 and 5,212,872 describe touch trigger probes that sense when a stylus contacts an object to allow the position of points on the surface of the object to be measured. The stylus is attached to the body of the touch trigger probe by a sprung, movable joint that only allows angular (tilting) motion of the proximal end of the stylus away from a repeatable rest position.

The present inventors have recognised that the above-described ultrasound measurement devices have certain disadvantages. For example, they have found that the gimbal mechanism described in US2009/0178482 is quite bulky and needs to be placed as close as possible to the distal end of the ultrasound device to reduce the amount of lateral motion of the ultrasound transducer across the surface of the object when self-aligning. The spherical bearing arrangement of US2013/0074601 is also relatively large and heavy. This can prevent the measurement of certain objects where access to the surface is restricted (e.g., inside bore holes or on complex turbine blade arrangements). The two-axis rotary head of WO2016/051147 allows precise alignment of the ultrasound device but it is also bulky and unsuitable for use in machine tool applications where real-time positional feedback is typically not possible. The linear (non-pivoting) motion of the tubular sleeve described in WO2021/038106 is more compact and prevents damage to the device when engaging a surface, but it requires the device to be angularly aligned to the surface to a very high degree of accuracy.

According to a first aspect of the present invention, there is provided an ultrasound inspection probe, comprising;

- a probe body for mounting to a coordinate positioning apparatus,
- an elongate member extending from the probe body, the elongate member comprising an ultrasound transducer assembly and a datum surface at its distal end, and
- a movable joint connecting a proximal end of the elongate member to the probe body,
- wherein the movable joint is configured to permit lateral and rotational movement of the proximal end of the elongate member relative to the probe body such that the elongate member can rotate about its distal end to allow the datum surface to angularly align with a surface of an object to be inspected,
- the movable joint comprises a carrier member, a seat and a biasing mechanism, the carrier member being provided at the proximal end of the elongate member and the probe body comprising the seat, the biasing mechanism urging the carrier member into engagement with the seat in the absence of an applied external force to thereby define a repeatable rest position of the elongate member relative to the probe body, and
- the movable joint is configured such that imparted axial movement of the elongate member relative to the probe body causes the carrier member to at least partially disengage the seat thereby allowing lateral movement of the proximal end of the elongate member relative to the probe body.

An ultrasound inspection probe, or ultrasound probe for short, is thus provided that is configured for use with a coordinate positioning apparatus, such as a machine tool, a coordinate measuring machine or an industrial robot. The ultrasound probe comprises a probe body that is mounted or mountable to the coordinate positioning apparatus and has an elongate member that extends or protrudes from the probe body. The elongate member comprises an ultrasound transducer assembly which is described in more detail below. As also explained below, the elongate member or a part of the elongate member may be permanently attached to, or integrated with, the probe body via the movable joint or it may be removably attachable to the probe body.

The elongate member has a datum surface at its distal end (i.e., a datum surface is provided at the distal end of the elongate member). The distal end of the elongate member is the end of the elongate member that is furthest from the probe body. In one embodiment, the datum surface may be an annular face or ring provided at the distal end of an elongate member having a tubular form. The datum surface acts as a physical reference or datum that is configured to contact the object to be measured. In particular, the datum surface provides a reference surface that mechanically aligns the elongate member with the surface of the object to be inspected. For example, a plane of the datum surface may lie parallel to the plane of the surface that it has been placed into contact with. As explained below, this allows ultrasound to be coupled into an object along a certain direction (e.g., along the object's surface normal) to optimise measurement. The datum surface may comprise a single, continuous datum surface (e.g., an annular ring or a flat plate) or it may be formed from a plurality of (non-continuous) spaced-apart surface sections (e.g., a plurality of partial ring segments). In a preferred embodiment, the elongate member may be a tubular sleeve and the distal end of the elongate (tubular) member may provide the datum surface. For example, if the elongate member is tubular and has a circular cross-section, the distal annular end-face of the elongate tubular member may provide a planar datum surface.

The elongate member is movably attached to the probe body via the movable joint. The movable joint thus allows the elongate member to move (deflect) relative to the probe body thereby reducing the need to precisely align the entire ultrasound inspection probe with the object to provide acoustic contact. In particular, the movable joint connects a proximal end of the elongate member to the probe body. As explained below, the movable joint may be provided within the probe body. In other words, the proximal end of the elongate member may be located fully or partially within the probe body and the elongate member may then protrude out of the probe body. It should also be noted that the probe body may have any suitable shape and may optionally be longer than the elongate member. For example, the probe body may comprise an elongate, substantially cylindrical casing or housing from which the elongate member extends. The probe body may also include an elongate protrusion that has the moveable joint located at its distal end. For example, the moveable joint may be located at the distal end of an elongate stem or extension piece of the probe body.

The movable joint is configured to permit both lateral and rotational movement of the proximal end of the elongate member relative to the probe body. The permitted lateral (side-to-side) movement is motion of the proximal end of the elongate member in a direction transverse (orthogonal) to the longitudinal axis of the elongate member. The permitted rotational movement is angular (e.g., tilting or pivoting) motion of the proximal end of the elongate member relative to the probe body. The movable joint may also allow the elongate member to rotate about its own axis and/or it may allow translational motion (i.e., motion back and forth) along the longitudinal axis of the elongate member.

Importantly, the lateral and rotational movement of the proximal end of the elongate member relative to the probe body that is allowed by the movable joint enables the datum surface to angularly align with a surface of an object to be inspected. In particular, the movable joint is configured such that the constraint imposed by the movable joint on the lateral and rotational movement of the proximal end of the elongate member is sufficiently low to allow the elongate member to rotate (e.g., pivot) about its distal end. In other words, freeing up the lateral constraint of the elongate member at the movable joint allows rotation about a point at or near the distal end of the elongate member. Such rotation about the distal end of the elongate member (i.e., where the datum surface is located) results in there being no significant lateral motion of that distal end during reorientation of the elongate member thereby preventing the datum surface from having to move (laterally) along the surface of an object when it is reorientating to align with that surface. In this manner, surface damage (e.g., scratching that May occur when moving a datum surface across a surface) is reduced or eliminated. Furthermore, it can then also be ensured that an ultrasound measurement is taken at a desired point on the surface of the object even if the elongate member has to reorientate to allow full engagement and alignment of the datum surface with the surface of the object.

The movable joint comprises a carrier member provided at the proximal end of the elongate member. In one embodiment, the carrier member may be releasably attachable to the remainder of the elongate member. For example, the carrier member may be provided as a stylus holder that forms part of the movable joint and the remainder of the elongate member may be provided as an ultrasound stylus (e.g., an elongate tubular sleeve containing the ultrasound transducer assembly) that can be releasably attached to the stylus holder. The movable joint also comprises a seat. In particular, the probe body comprises the seat. For example, the seat may be formed on or within the probe body. The seat may be in a fixed location relative to the rest of the probe body. The carrier member and the seat are configured so that they adopt a repeatable rest position when they are engaged with each other. The movable joint also comprises a biasing mechanism, such as a spring, which urges the carrier member into engagement with the seat in the absence of an applied external force to thereby define a repeatable rest position of the elongate member relative to the probe body. The biasing mechanism thus applies a spring or biasing force to the carrier member, which is reacted back to the probe body, that urges (e.g., pushes or pulls) the carrier member into engagement with the seat. In this manner, the elongate member adopts the same (repeatable) rest or reference position relative to the probe body when it is not defected away from that rest position due to an externally applied force (e.g., due to deflection arising from contact with an object).

The movable joint is also configured such that imparted axial movement (i.e., motion of the elongate member relative to the probe body along the direction of the longitudinal axis of the elongate member) of the elongate member relative to the probe body causes the carrier member to at least partially disengage the seat. Such axial motion may be in addition to or caused by angular motion (rotational) of the elongate member. This allows lateral movement of the proximal end of the elongate member relative to the probe body. In other words, imparted axial motion (which includes motion that has an axial component) partially or fully disengages or unseats the carrier member from the seat. This, in turn, allows lateral movement of the proximal end of the elongate member. In this manner, the elongate member maintains a well-defined rest position relative to the probe body until the movable joint is unseated by imparted axial motion of the elongate member relative to the probe body. Such axial displacement of the elongate member relative to the probe body may also be used to help absorb any so-called over-travel and can thus provide an over-deflection protection mechanism that prevents damage to the ultrasound probe when it is moved into contact with a surface.

It can thus be seen that the ultrasound inspection probe of the present invention has various advantages over the prior art devices mentioned above. For example, the present invention removes the need to locate a bulky gimbal mechanism or spherical ball joint near the distal end of an elongate member as described in US2009/0178482 and US2013/0074601 respectively. The present invention is also advantageous over US2013/0074601 as there is no need to lubricate a spherical bearing to reduce friction nor the need to route electrical signals through a spherical bearing. The need for the use of a two-axis rotary head to align the ultrasound probe as per WO2016/051147 is also removed. Similarly, the tight angular alignment tolerances required when using the linearly sliding mechanism of WO2021/038106 are avoided.

In a preferred embodiment, the carrier member and the seat are configured to provide a kinematically defined rest position. In other words, each of the six degrees of freedom of motion of the carrier member relative to the seat are constrained. The lack of any over-constraint ensures that the same rest position is attained with a high level of repeatability. The carrier member may advantageously comprise three radially extending rollers and the seat comprise three pairs of balls, each pair of balls defining a cleft for receiving one of the rollers. Such an arrangement of balls and rollers has been found to provide a high accuracy kinematic joint. Any axial motion of the carrier member (which may arise from rotation or pivoting of the carrier member) will disengage (or lift-off) one or more of the rollers from its cleft thereby allows lateral motion of the carrier member relative to the seat. It would also be possible for the seat of the probe body to comprise three radially extending rollers and for the carrier member to comprise three pairs of balls for receiving the rollers.

As outlined above, a biasing mechanism is provided to urge the carrier member into engagement with the seat. A rest (neutral) position as defined by the carrier member and seat is thus provided in the absence of an applied external force. Any suitable biasing mechanism may be used. For example, the biassing mechanism may comprise one or more springs. Advantageously, the biasing mechanism comprises a compression spring. Such a spring may be reacted back to the probe body. The compression spring may be a coil spring.

The probe body may also comprise a guide channel in which the compression spring is at least partially housed or contained. The guide channel may be co-axial with the compression spring when the elongate stylus is in a rest (neutral) position. The guide channel may be dimensioned (e.g., it may have an inner diameter slightly greater than the compression spring outer diameter) to prevent or restrain lateral motion of some or a part of the compression spring when the elongate member is deflected from its rest or neutral position. For example, the guide channel may be configured to prevent at least part of the compression spring from buckling or moving laterally when there is lateral motion at the movable joint. In a preferred embodiment, the guide channel is provided to house the proximal section of the compression spring (i.e., the section of the compression spring attached to the probe body and furthest from the moveable joint). The guide channel thus helps to ensure that, when the elongate member is deflected relative to the probe body, the compression spring does not buckle or bend in a way that applies an unpredictable or unwanted force to the elongate member (e.g., that acts so as to stop the distal end of the elongate member from aligning with the object to be inspected).

Conveniently, the biasing mechanism engages the probe body and/or the carrier member via a conical member (e.g., a member having a conical or partially conical tip). The tip of the conical member may engage an engagement feature, such as a plate, cup or recess. The conical member may be provided as part of the biasing mechanism and the engagement feature as part of the carrier member or probe body, or vice versa. In a preferred embodiment, the biasing mechanism comprises a compression spring and a conical member is provided at (e.g., attached to) a distal end of the compression spring. The carrier member may then comprise an engagement feature, such as a plate or a cup, against which the tip of the conical member is urged by the compression spring to thereby bias the carrier member into the seat. This arrangement reduces Hertzian stress. Alternatively, or additionally, a conical member may be provided at the proximal end of such a compression spring. The probe body may then comprise the engagement feature against which the conical member is urged. The use of such an arrangement (i.e., one or more conical members pressed into contact with one or more engagement features) allows a linear (axial) biasing force to be applied to the carrier member, without imparting or inhibiting any rotational or pivoting motion of the carrier member. In this manner, the compression spring does not itself constrain or cause any pivoting or angular motion of the carrier member.

Advantageously, the conical member and the engagement feature are formed from materials having a different hardness. Advantageously, the hardness of the material providing the engagement feature is higher than that of the conical member. For example, the engagement feature may comprise a tool steel. Such a tool steel may have a harness of around 60 RHC (Rockwell Hardness C). The conical member may comprise a hardened steel. Such a hardened steel may have a hardness of around 40 RHC. This difference in hardness reduces mechanical wear.

Preferably, the movable joint allows at least 0.5 mm of lateral motion of the proximal end of the elongate member. More preferably, the movable joint allows at least 0.75 mm of lateral motion of the proximal end of the elongate member. More preferably, the movable joint allows at least 1 mm of lateral motion of the proximal end of the elongate member. More preferably, the movable joint allows at least 1.5 mm of lateral motion at the proximal end of the elongate member. The amount of rotation that can occur at the distal end of the elongate member depends on the amount of lateral motion of the proximal end of the elongate member and the length of the elongate member. Preferably, the allowed lateral motion of the proximal end of the elongate member enables the distal end of the elongate member to rotate (i.e., tilt) by at least 0.25°. More preferably, rotation (i.e., tilting) of at least 0.4° is provided. More preferably, rotation of at least 0.5° is provided. More preferably, rotation of at least 0.6° is provided. Advantageously, the elongate member is at least 2 cm long, more preferably it is at least 5 cm long and more preferably it is at least 10 cm long.

The elongate member that protrudes from the probe body may have any suitable shape. Advantageously, the elongate member comprises an elongate tubular member. For example, the elongate member may be provided in the form of a tube or tubular sleeve. The elongate member may be substantially straight.

Alternatively, the elongate member may not be straight. For example, the elongate member may include an angled joint, kink, curved portion or dog-leg connection. At least a portion of the elongate member may be hollow or include a hollow inner cavity. The elongate member may have any suitable cross-sectional profile, such as a square, rectangular, or oval cross-section. Advantageously, the elongate member has a substantially circular cross-section. The elongate member may comprise a single part or tube (i.e., it may be provided as a unitary component). Alternatively, the elongate member may be formed from a plurality of sections (e.g., a plurality of tubular sections). These sections may be permanently attached (e.g., bonded) to one another. Alternatively, such sections may be releasably attached to one another to allow sections to be removed or replaced as necessary. The ability to disassembly the elongate tubular member may be advantageous for maintenance or repair purposes.

The elongate member comprises the ultrasound transducer assembly that is used for measuring the object to be inspected. The ultrasound transducer assembly may be at least partially mounted or housed within a cavity defined by the elongate member. The ultrasound transducer assembly preferably comprises an ultrasound transducer. The ultrasound transducer may emit ultrasound. The ultrasound transducer may detect ultrasound. The ultrasound transducer may both emit and detect ultrasound. Any suitable ultrasound mode (e.g., transverse or longitudinal) may be generated and/or detected by the ultrasound transducer. For example, the ultrasound transducer may generate ultrasound and detect returned ultrasound to implement pulse-echo ultrasound detection.

The ultrasound transducer assembly may also comprise an ultrasound coupling element. The ultrasound coupling element may be provided as part of an ultrasound coupling assembly. In other words, the ultrasound transducer assembly may include an ultrasound transducer and an ultrasound coupling assembly that includes an ultrasound coupling element. The ultrasound coupling assembly may also be termed an ultrasound delay line.

The ultrasound coupling element, or coupling element for short, may be formed from any material that is a sufficiently good conductor of ultrasound.

Advantageously, the acoustic attenuation of the material forming the ultrasound coupling element is less than 20 dB/mm at 5 MHz. More preferably, the acoustic attenuation of the material forming the ultrasound coupling element is less than 10 dB/mm at 5 MHz. More preferably, the acoustic attenuation of the material forming the ultrasound coupling element is less than 5 dB/mm at 5 MHz. More preferably, the acoustic attenuation of the material forming the ultrasound coupling element is less than 2.5 dB/mm at 5 MHz. More preferably, the acoustic attenuation of the material forming the ultrasound coupling element is less than 1 dB/mm at 5 MHz.

The ultrasound coupling element may be formed from any suitable ultrasound conducting material. Conveniently, the ultrasound coupling element comprises a so-called dry or soft coupling material that allows ultrasonic coupling with an object without requiring use of an ultrasound couplant gel or the like. In other words, the ultrasound coupling element may comprises an elastic (i.e., elastically deformable) ultrasound coupling element. The ultrasound coupling element is preferably sufficiently elastic (soft) to deform to the surface of the object. For example, the ultrasound coupling element may comprise a material which will form a direct acoustic coupling with a flat ($Ra<0.8$ μm) piece of metal, such as Aluminium, when subjected to an average pressure not exceeding 3 MPa. The material may also be sufficiently elastic to deform reversibly until its faces are misaligned by up to 1°. Preferably, the hardness of the ultrasound coupling element is less than 100 shore A. More preferably, the hardness of the ultrasound coupling element is less than 90 shore A. More preferably, the hardness of the ultrasound coupling element is less than 50 shore A. For example, the hardness of the ultrasound coupling element may be around 30 shore A. Advantageously, the material is highly deformable with an elongation at break exceeding 50%. This should be contrasted to a hard ultrasonic coupling material, such as Rexolite (registered trademark), which has a shore A hardness of 100 (i.e. off the shore A scale) and an elongation at break of 2-3%.

The elastically deformable ultrasound coupling element may comprise a heat cure Silicone rubber. A heat cure silicone, also known as high-consistency rubber (HCR), is advantageous because it is relatively cheap to mould. Such an HCR can also be moulded and bonded to a carrier shell in one operation, removing the need for gluing the rubber to a housing or shell. An example of such a HCR is the Aquasilox material sold by innovation polymers, Kitchener, Ontario, Canada. Other Silicones could be used, such as Liquid Silicone Rubber (LSR) or the like. For example, the LSR material "Ultracouple dry couplant" produced by Sonemat Ltd, Warwick UK.

The ultrasound transducer assembly may comprise an ultrasound transducer that is acoustically coupled to the above-described ultrasound coupling element. In particular, the ultrasound transducer is conveniently placed in physical and acoustic contact with a transducer-contacting face of the ultrasound coupling element. Such physical contact may be direct, or it may be indirect (e.g., via an intermediate component, such as an adhesive). The ultrasound generated by the ultrasound transducer may thus be coupled into the object to be inspected via the ultrasound coupling element. The ultrasound transducer and the ultrasound coupling element may together enable thickness or flaw measurements etc of an object to be taken.

In one embodiment, an ultrasound coupling assembly may be provided that includes a carrier shell and an ultrasound coupling element. The ultrasound coupling element may be at least partially contained within the carrier shell. An object-contacting face of the ultrasound coupling element may extend from the carrier shell. Advantageously, the carrier shell of such an ultrasound coupling assembly comprises a substantially rigid material. Preferably the substantially rigid material at least partially constrains the ultrasound coupling element. For example, the carrier shell may be sufficiently rigid to prevent or inhibit the material forming the ultrasound coupling element from expanding in a certain direction. There may thus be direct contact (i.e., no gap) between the carrier shell and the ultrasound coupling element.

The carrier shell may comprise an ultrasound absorbing material. The carrier shell may be formed from a plastic material, such as PTFE. The carrier shell may comprise a metal, such as Aluminium. Aluminium is advantageous because it is easy to process and does not deform when a compressive force is applied to the ultrasound coupling element it contains. The carrier shell may comprise internal serrations or ridges (e.g., to suppress ultrasound reflections). The carrier shell and ultrasound coupling element may be formed as a unitary component. For example, a carrier shell may be formed by hardening an outer region of material surrounding the ultrasound coupling element. Alternatively, the ultrasound coupling element may be inserted, cast and/or bonded into a separate (discrete) carrier shell.

Preferably, the carrier shell is substantially tubular. Conveniently, the carrier shell is substantially tubular and has a circular cross-section. In such an example, the ultrasound coupling element may be radially constrained by the tubular carrier shell. A cylindrical ultrasound coupling assembly may thus be provided. The ultrasound coupling element may not inhibit (i.e., it may be configured to permit) axial (longitudinal) expansion of the ultrasound coupling element.

An acoustic axis of the ultrasound transducer may approximately coincide with the longitudinal axis of the carrier shell.

Advantageously, the ultrasound coupling element may have an object-contacting face and a transducer-contacting face which are provided at opposite ends (e.g., at the front and rear) of the ultrasound coupling element. The transducer-contacting face may be substantially parallel to object-contacting face. The object-contacting face and/or the transducer-contacting face may be dome-shaped. All of the material of the ultrasound coupling element may be located between the transducer-contacting and object-contacting faces. The faces (ends) of the ultrasound coupling element may also protrude slightly from a carrier shell provided around the side or sides of the ultrasound coupling element. The constraint provided by the carrier shell preferably prevents radial expansion of the ultrasound coupling element but allows longitudinal movement (expansion or deformation) of the ultrasound coupling element. In other words, a compressive force applied between the object-contacting and transducer-contacting faces may distort the ultrasound coupling element without there being any radial expansion of that coupling element. For example, dome-shaped faces may be flattened when a compressive force is applied. This arrangement thus allows a high compressive force, e.g., 10N or more, to be applied to the object-contacting and transducer-contacting faces without any radial expansion of the ultrasound coupling element occurring. In addition, the object contacting face can conform to the shape of the object's surface thereby improving acoustic coupling without affecting the acoustic alignment. This high contact force can thus provide an ultrasound signal with lower signal attenuation.

In a preferred embodiment, the elongate member comprises a tubular sleeve that houses the ultrasound transducer assembly. In such an arrangement, the distal end of the tubular sleeve may provide the datum surface. In other words, the datum surface may be provided by a face or other feature of the elongate member. An elastically deformable ultrasound coupling element may then move and/or deform sufficiently on contact with an object to allow the datum surface to engage and align with the object. In this manner, the deformation or movement of the elastically deformable ultrasound coupling element means that it does not affect the alignment of the elongate member with the surface of the object that is to be measured.

Advantageously, the ultrasound transducer assembly is movably mounted to the elongate member. In particular, the ultrasound probe may comprise a bearing mechanism that movably attaches the ultrasound transducer assembly (e.g., an ultrasound coupling assembly and an ultrasound transducer) to the elongate member. For example, the ultrasound coupling assembly and the ultrasound transducer may be slidably mounted within an elongate member.

A bearing mechanism may conveniently be provided that is configured to guide the ultrasound transducer along a linear axis of the elongate member. In other words, the bearing mechanism may control motion of the ultrasound transducer so that it is constrained to only move back and forth along a linear axis of the elongate member to which it is movably attached. The constraint provided by such a bearing mechanism preferably allows translational motion (i.e., motion in a straight line) of the ultrasound transducer along the linear axis of the elongate member. Preferably, the bearing mechanism is configured to maintain the orientation of the ultrasound transducer relative to the normal to the datum surface when it is translated back and forth along such a linear axis. In other words, rotation or tilting of the transducer may be constrained as necessary by the bearing mechanism to ensure the ultrasound transducer maintains a substantially invariant orientation relative to the normal to the datum surface. Taking the linear axis as the direction of motion, this can be considered as preventing pitch and yaw of the ultrasound transducer. Roll of the ultrasound transducer does not alter the orientation of the ultrasound transducer relative to the normal to the datum surface. It is, however, also possible (although not essential) to fully or at least partially constrain roll of the ultrasound transducer.

Preferably, the linear axis of ultrasound transducer motion is substantially parallel to the surface normal of the datum surface. In other words, the linear axis may be substantially perpendicular to a plane containing the datum surface. In this manner, the linear axis along which the ultrasound transducer translates will also be substantially perpendicular to the surface of an object that is placed into contact with the datum surface. Although providing such perpendicular alignment is preferred, other (e.g., known) orientations of the plane containing the datum surface and the linear axis may be provided.

The bearing mechanism may guide motion of all or some of the ultrasound transducer assembly. For example, the bearing mechanism may guide motion of the ultrasound transducer and/or the ultrasound coupling assembly. The bearing mechanism may include a single bearing arrangement for guiding a unitary ultrasound transducer assembly module that comprises both the ultrasound transducer and an ultrasound coupling element. The bearing mechanism may be configured so that the entire unitary module maintains a substantially invariant orientation relative to the surface normal of the datum surface as it is guided back and forth along the linear axis of the elongate member. Alternatively, the bearing mechanism may guide motion of the ultrasound transducer and an ultrasound coupling assembly may be attached to the ultrasound transducer and thereby also (indirectly) guided by the bearing mechanism. Conversely, the ultrasound transducer may be indirectly guided if attached to an ultrasound coupling assembly that is directly guided by the bearing mechanism.

The ultrasound transducer and an ultrasound coupling assembly may also be attached to the elongate member by separate portions of the bearing mechanism. This allows relative (linear) movement of the ultrasound transducer and the ultrasound coupling assembly and is advantageous because it allows the compressive force applied to the ultrasound coupling element to be controlled by a biassing force applied via the ultrasound transducer. The bearing mechanism may thus comprise a first bearing portion for guiding the motion of the ultrasound transducer relative to the elongate member. This first bearing portion guides the ultrasound transducer along the linear axis of the elongate member and thus ensures the ultrasound transducer maintains a substantially invariant orientation relative to the normal of the datum surface. The bearing mechanism may further comprise a second bearing portion for guiding motion of an ultrasound coupling assembly relative to the elongate member. The second bearing portion may guide the ultrasound coupling assembly along the linear axis of the elongate member to ensure the ultrasound coupling assembly maintains a substantially invariant orientation relative to the normal of the datum surface. The tolerance of the guidance provided by the second bearing portion may, however, be lower than that provided by the first bearing portion. In particular, maintaining the angular orientation of the ultrasound coupling assembly when it is guided back and forth along the linear axis is less critical. Any slight deviations of the ultrasound coupling assembly away from a linear path and/or any angular changes (pitch, yaw or roll) in the orientation of the ultrasound coupling assembly relative to the normal to the datum surface are unlikely to significantly affect the acoustic path between the transducer and the object being inspected. In other words, the "play" of the second bearing portion can be substantially higher than the play of the first bearing portion without affecting the overall measurement performance.

The bearing mechanism may be implemented in a variety of ways. In particular, the ultrasound probe may comprise any suitable bearing arrangement or arrangements that provide the required control over the motion of the ultrasound transducer and/or the ultrasound coupling assembly. In one embodiment, sliding bearings are provided that comprise one or more bearing surfaces formed on each of the ultrasound coupling assembly, the ultrasound transducer and the inner surface of the elongate member. Alternatively, a ball-bearing slide may be provided.

In a preferred embodiment, the bearing mechanism comprises a first bearing portion that is provided by a moulded outer surface of the ultrasound transducer that is in sliding contact with an inner surface of the elongate member. For example, the outer surface of a layer of adhesive (e.g., epoxy) that surrounds (e.g., encapsulates) the ultrasound transducer may provide such a moulded outer surface. Advantageously, the moulded outer surface of the ultrasound transducer conforms to (i.e., matches the contours of) the inner surface of the elongate member. Preferably this is achieved by forming the moulded outer surface within the elongate member (e.g., by curing an adhesive when the ultrasound transducer is located within the elongate member). In this manner, the inner surface of the elongate member acts as the mould for the moulded outer surface. The moulded outer surface of the ultrasound transducer thus accurately replicates the form of the inner surface of the elongate member thereby providing a high accuracy sliding bearing. The bearing mechanism may also comprise a second bearing portion that includes protrusions (e.g., O-rings) provided on the outer surface of the carrier shell which are in sliding contact with an inner surface of the elongate member. Although such a protrusion-based arrangement typically has more play than the moulded arrangement mentioned above for the first bearing portion, it has been found to provide adequate linear guidance of the ultrasound coupling assembly.

As described above, a bearing mechanism may guide components of the ultrasound transducer assembly, such as the ultrasound transducer, along a linear axis of the elongate member. The ultrasound transducer that forms part of the transducer assembly may emit (direct) or receive (collect) ultrasound energy along an acoustic axis that has a certain orientation relative to the linear axis that is mechanically defined by the bearing mechanism. Advantageously, the ultrasound transducer emits and/or receives ultrasound along at least a first acoustic axis. The ultrasound transducer may also emit and/or receive ultrasound along one or more further acoustic axes. In the case of an emitted signal, the acoustic axis is the direction of maximum emitted signal strength. In the case of a received signal, the acoustic axis is the direction of maximum sensitivity to the incoming ultrasound signal. There may also be different acoustic axes for different ultrasound modes.

For example, different acoustic axes may be present for longitudinal and transverse modes. Preferably, the first acoustic axis is the acoustic axis for the ultrasound mode that the device is configured to use for measurement.

The position and/or orientation of the first acoustic axis may be known and/or fixed relative to a linear axis along which the ultrasound transducer can move back and forth. In this manner, the normal to the datum surface of the elongate member can also have a fixed orientation relative to the first acoustic axis. Advantageously, the first acoustic axis is configured to be substantially parallel to the linear axis along which the ultrasound transducer is guided. The linear axis and the first acoustic axis may be laterally offset. Advantageously, the linear axis and the first acoustic axis are substantially coincident. If the linear axis is arranged to be substantially perpendicular to a plane containing the datum surface, then the first acoustic axis can also be configured to be substantially perpendicular to the plane containing the datum surface. Consequently, the first acoustic axis of the ultrasound inspection probe can be configured to be substantially perpendicular to the datum surface. In this manner, it can be ensured that ultrasound is coupled into the surface of the object from a direction that is perpendicular to the surface of the object (i.e., because the acoustic axis will also be substantially perpendicular to the surface of the contacted object). Directing ultrasound into an object along its surface normal direction will typically maximise the return signal and can also ensure any measurements, for example of object thickness, correspond to a known position within the object.

Advantageously, the first acoustic axis is aligned to the normal of the datum surface to within 1°. More preferably, the first acoustic axis is aligned to the normal of the datum surface to within 0.5°. More preferably, the first acoustic axis is aligned to the normal of the datum surface to within 0.2°. More preferably, the first acoustic axis is aligned to the normal of the datum surface to within 0.1°. In one embodiment, the first acoustic axis may be aligned to the normal of the datum surface with a tolerance of around 0.08° or less. These tolerances can thus also define the tolerance to which the first acoustic axis is aligned relative to the surface normal of an object being inspected.

The ultrasound probe may be arranged to allow the orientation of the first acoustic axis to be adjusted relative to the linear (mechanical) axis of motion of the ultrasound transducer. For example, the ultrasound transducer may include an internal adjustment mechanism for steering the direction of the first acoustic axis. This internal adjustment mechanism may be mechanical or electronic and allows the angle of the first acoustic axis to be adjusted relative to the mechanical axis of motion and hence relative to the normal of the datum surface. In this manner, the angle at which ultrasound is directed at the surface of an object to be inspected can be adjusted.

If the above-described bearing mechanism is provided (e.g., comprising the first and second bearing portions mentioned above) it may be configured so that the angular orientation of the ultrasound transducer relative to the normal of the datum surface can be mechanically adjusted. It should be noted that once adjusted the angular orientation of the ultrasound transducer preferably remains invariant relative to the normal of the datum surface as it is translated back and forth along the linear axis. This mechanical adjustment of the bearing mechanism may be instead of, or in addition, to any adjustment of the angle of the first acoustic axis relative to the mechanical axis of motion. Any adjustment of the orientation of the ultrasound transducer or the first acoustic axis relative to the normal of the datum surface may only be possible during initial manufacture or configuration of the ultrasound probe. In other words, the end user may not be able to make such adjustments. Alternatively, the orientation of the ultrasound transducer or the first acoustic axis relative to the normal of the datum surface may be adjusted as and when required. For example, such adjustments may be made during a periodic calibration procedure to ensure ultrasound is directed in a defined direction (e.g., perpendicular to) the surface of the object being inspected.

In a preferred embodiment, the ultrasound probe comprises a transducer assembly that comprises an ultrasound transducer and an ultrasound coupling assembly that are each movably mounted to the elongate member. The ultrasound probe is conveniently configured so that the ultrasound coupling assembly can move relative to the elongate member between a measurement (retracted) position and an extended position. In the extended (i.e., non-measurement) position an object-contacting face of the ultrasound coupling element extends beyond the datum surface of the elongate member. The object-contacting face may thus be the distal-most portion of the ultrasound probe when in the extended position. In the measurement position, the object-contacting face is positioned to lie substantially flush with the datum surface of the elongate member. In the measurement position, the object-contacting face is thus retracted compared to the extended position. It would, of course, be possible for other positions of the ultrasound coupling assembly to be adopted. For example, further retraction beyond the measurement position and/or further extension past the extended position may be possible.

The ultrasound probe may further comprise a second biassing mechanism for urging the ultrasound coupling assembly towards the above-described extended position. It is noted that the above-described biasing mechanism that is separately provided as part of the movable joint may then be termed the first biasing mechanism. The second biassing mechanism may comprise a compression spring or similar. The second biasing mechanism may directly or indirectly engage the ultrasound coupling assembly to apply the bias. Advantageously, the second biasing mechanism applies the bias to the ultrasound coupling assembly via the ultrasound transducer. For example, the object-contacting face of the ultrasound coupling element may be configured to contact the object that is being measured whilst the transducer-contacting face of the ultrasound coupling element contacts the ultrasound transducer. The second biasing mechanism can thus urge the ultrasound transducer into contact with the transducer-contacting face of the ultrasound coupling element thereby urging the object-contacting face of the ultrasound coupling element into engagement with the object. In other words, the biassing force applied by the second biasing mechanism to the ultrasound coupling element is passed through the ultrasound transducer. The same magnitude of biasing force will then urge the transducer into contact with the transducer-contacting face and also urges the object-contacting face into contact with the object.

The provision of such a second biassing mechanism results in the extended position being adopted in the absence of an applied external force, such as before bringing the ultrasound probe into contact with an object to be measured. The act of engaging the datum surface of the elongate tubular member with the object to be inspected thus causes an external force to be applied to the object-contacting face of the ultrasound coupling element by the object. This external force moves the ultrasound coupling assembly relative to the elongate member into the measurement position, against the bias that is provided by the biasing mechanism. The act of bringing the ultrasound probe into contact with an object thus overcomes the biasing force and causes the ultrasound coupling assembly to retract. However, the datum surface of the elongate member limits the amount of retraction of the ultrasound coupling assembly. After the datum surface has engaged the object to be inspected, it is thus the second biasing mechanism alone that controls the magnitude of the force applied to the ultrasound coupling element via the ultrasound transducer.

The above-described arrangement makes measurements more repeatable because they do not depend on accurately positioning the ultrasound probe relative to the object to ensure that a certain force is applied to the object being inspected and/or that the coupling element is subjected to a certain compressive force. In addition, the force applied by the second biasing mechanism can be configured to be minimally dependent on the thickness of the coupling element. For example, the biassing mechanism could comprise a spring with a low spring rate and a high pre-load. Such an arrangement allows the coupling element to expand in oil by a significant amount without affecting the applied compressive force.

In a preferred embodiment, the elongate member may thus comprise a tubular sleeve and the ultrasound transducer assembly may be mounted within the tubular sleeve by a bearing mechanism, the bearing mechanism being configured to guide the ultrasound transducer assembly back and forth along a linear axis of the elongate member such that the ultrasound transducer maintains a substantially invariant orientation relative to the surface normal of the datum surface.

In an alternative embodiment, the face of the coupling element can act as the position reference or datum surface that is used to align the elongate member to the surface of the object being inspected. For example, the ultrasound transducer assembly may comprise an ultrasound transducer and a constrained or rigid coupling element for acoustically coupling the ultrasound transducer to an object to be inspected. If a hard coupling element or delay line (e.g., formed from Rexolite) is provided this may require the use of couplant gel to obtain adequate acoustic coupling with an object. In such an arrangement, the distal end of the coupling element may provide the datum surface of the elongate member (i.e., a separate datum face is not provided).

Advantageously, the ultrasound probe further comprises a deflection sensor to sense deflection of the elongate member relative to the probe body. The deflection sensor may, when deflection of the elongate member relative to the probe body is detected, generate a trigger signal that is output by the ultrasound probe to indicate that contact with an object has been made. The deflection sensor may simply sense if the elongate member has been deflected relative to the probe body, without measuring the magnitude or direction of such deflection. Alternatively, the deflection sensor may measure (transduce) the magnitude and optionally the direction of any deflection of the elongate member relative to the probe body. The deflection sensor may be provided at the movable joint. The movable joint may incorporate the deflection sensor. The deflection sensor may be optical, capacitive or electrical. For example, the above-described kinematically defined movable joint that uses ball and rollers to define a rest position may include an electrical circuit through the balls and roller. Deflection can then be sensed by monitoring when the electrical circuit is broken due to a roller lifting away from a pair of supporting balls. The signal (e.g., a trigger signal) produced by the deflection sensor may advantageously be used to stop motion of the ultrasound probe relative to the object. The signal produced by the deflection sensor may be used to measure the position of a point on the surface of the object. This allows the ultrasound probe to be moved into a defined location relative to the surface of the object being inspected, before being stopped to collect an ultrasound measurement. Optionally, one or more probe positioning moves (e.g., towards and/or away from the object) may be performed after receipt of the signal from the deflection sensor but before the collection of ultrasound measurements.

As outlined above, the ultrasound inspection probe may be used with any coordinate positioning apparatus. Advantageously, the ultrasound inspection probe is configured to be used with a machine tool. A machine tool, such as machining centre, milling machine, lathe etc typically has coolant fluid and cutting debris ejected at high speed. A machine tool is thus different to a coordinate measuring machine or inspection robot that is dedicated to measurement and is typically used in a clean environment, such as a temperature-controlled inspection laboratory. An ultrasound probe for a machine tool thus requires protection against the contaminants present in the machine tool environment. Preferably, ultrasound probe is substantially sealed against the ingress of coolant or cutting debris. Advantageously, the ultrasound inspection probe comprises an internal battery. This removes the need for a trailing wire and allows the ultrasound probe to be stored in a tool change carousel adjacent the machine tool enclosure and automatically exchanged with cutting tools etc when it is to be used. Conveniently, the ultrasound probe (e.g., the probe body) includes a wireless communications portion for wireless communication of acquired ultrasound measurement to a remote probe interface. The wireless communications portion may transmit and/or receive measurement over an optical link. The wireless communications portion may transmit and/or receive measurements over a radio link (e.g., a spread-spectrum link, such as a frequency hopping spread spectrum link). An apparatus may be provided that includes the ultrasound probe and such a probe interface. The ultrasound probe may be attachable, or attached, to a tool shank.

According to a second aspect of the present invention, a method is provided for the ultrasonic inspection of an object, the method comprising the steps of using a machine tool to bring an ultrasound inspection probe according to the first aspect of the invention into acoustic contact with the object to be inspected and coupling ultrasound into the object. The method may comprise measuring a thickness of the object and/or detecting flaws within the object.

As mentioned above, the ultrasound inspection probe may comprise a deflection sensor to sense deflection of the elongate member relative to the probe body. For such an ultrasound inspection probe, the method may comprise a step of (i) using the deflection sensor to sense physical contact of the elongate member with the surface of the object to be inspected. In other words, such an ultrasound inspection probe may also detect (i.e., using the deflection sensor) when the elongate member is in contact with the surface of an object. In a preferred embodiment, the ultrasound inspection probe may issue a trigger signal when contact of the elongate member with a surface is detected.

The method may also include a step of (ii) using the physical contact detected in step (i) to initiate ultrasound measurements of the object using the ultrasound inspection probe. For example, the ultrasound measurements of step (ii) may be initiated after the deflection sensor has issued a trigger signal indicating surface contact has been made. A controller of the associated machine tool that moves the ultrasound inspection probe relative to the object may receive the trigger signal. The machine tool controller may, on receipt of the trigger signal, instruct the ultrasound inspection probe to collect one or more ultrasound measurements.

The physical contact of the elongate member with the surface of an object (i.e., as measured by the deflection sensor) may be used to measure the position of a point on the surface of the object. For example, the relative position of the probe and the object may be measured on receipt of a trigger signal from the probe. The sensing of such physical contact may also be used to halt motion of the ultrasound inspection probe relative to the object to allow ultrasound measurements to be collected. In one embodiment, the machine tool may simply halt motion on receipt of a trigger signal from the ultrasound inspection probe and begin the ultrasound measurements. The elongate member will have aligned itself relative to the surface of the object in this example, i.e., disengagement of the carrier member from the seat will allow the elongate member to align itself relative to the object's surface when surface contact is made.

Alternatively, the machine tool may reposition the ultrasound inspection probe after surface contact has been sensed (e.g., after the position of a point on the surface of the object has been measured). In other words, the machine tool may be programmed to move the ultrasound inspection probe towards and/or away from the object between steps (i) and (ii) to establish acoustic contact for ultrasound measurement of the object. In particular, the ultrasound inspection probe may be moved into an optimum position for collecting acoustic measurements. This optimum position may comprise providing acoustic contact with the object whilst the carrier member remains engaged with the seat such that the elongate member remains in the repeatable rest position. For example, this step may comprise the machine tool moving (backing off) the ultrasound inspection probe so that it loses contact with the surface (i.e., so the carrier member and the seat engage whereupon the elongate member adopts its repeatable rest position). A step may then be performed of moving the ultrasound inspection probe back into contact with the surface to allow ultrasound measurement, but with a sufficiently low force to ensure the carrier member remains engaged with the seat. This is advantageous for curved or uneven object surfaces where the orientation of the elongate member can be uncertain if it is allowed to align itself to the surface.

Also described herein is an ultrasound inspection probe, comprising; a probe body for mounting to a coordinate positioning apparatus, an elongate member extending from the probe body, the elongate member comprising an ultrasound transducer assembly and a surface (e.g. a datum surface) at its distal end, and a movable joint connecting a proximal end of the elongate member to the probe body, wherein the movable joint is configured to permit lateral and rotational movement of the proximal end of the elongate member relative to the probe body such that the elongate member can rotate about its distal end to allow the surface (e.g. the datum surface) to angularly align with a surface of an object to be inspected.

The ultrasound inspection probe described herein may be provided with an integrated elongate member. Alternatively, the ultrasound inspection probe may include a holder for an elongate member (i.e., so that an elongate member can be releasably attached to the holder). In other words, an ultrasound inspection probe may comprise; a probe body for mounting to a coordinate positioning apparatus, a holder for attachment to an elongate member and a movable joint connecting the holder to the probe body, wherein the movable joint is configured to permit lateral and rotational movement of the holder relative to the probe body such that an elongate member attached to the holder can rotate about its distal end to allow a surface of the elongate member (e.g. a datum surface) to angularly align with a surface of an object to be inspected. The elongate member preferably comprises an ultrasound transducer assembly. The elongate member preferably comprises a surface (e.g., a datum surface) at its distal end for contacting the object to be measured. A kit may be provided that includes the ultrasound inspection probe and one or more elongate members that are attachable to the holder. The kit may include a plurality of elongate members. The plurality of elongate members may include different elongate members (e.g., having different lengths, transducers, coupling elements etc). One or more extension bars may be provided that can be located between the elongate member and the holder to increase the separate between the distal end of the elongate member and the probe body.

Advantageously, the movable joint comprises a carrier member. The carrier member may be provided at the proximal end of the elongate member. In one embodiment, the carrier member may be releasably attachable to the remainder of the elongate member. For example, the carrier member may be provided as a stylus holder that forms part of the movable joint and the remainder of the elongate member may be provided as an ultrasound stylus (e.g., an elongate tubular sleeve containing the ultrasound transducer assembly) that can be releasably attached to the stylus holder. Advantageously, the movable joint comprises a seat. The probe body may comprise the seat. For example, the seat may be formed on or within the probe body. The seat may be in a fixed location relative to the rest of the probe body. The carrier member and the seat may be configured so that they adopt a repeatable rest position when they are engaged with each other. The movable joint may also comprise a biasing mechanism, such as a spring. The biasing mechanism preferably urges the carrier member into engagement with the seat in the absence of an applied external force to thereby define a repeatable rest position of the elongate member relative to the probe body. The biasing mechanism may thus apply a spring or biasing force to the carrier member, which is reacted back to the probe body, that urges (e.g., pushes or pulls) the carrier member into engagement with the seat. In this manner, the elongate member adopts the same (repeatable) rest or reference position relative to the probe body when it is not defected away from that rest position due to an externally applied force (e.g., due to deflection arising from contact with an object).

Conveniently, the movable joint is configured such that imparted axial movement (i.e., motion of the elongate member relative to the probe body along the direction of the longitudinal axis of the elongate member) of the elongate member relative to the probe body causes the carrier member to at least partially disengage the seat. Such axial motion may be in addition to or caused by angular motion (rotational) of the elongate member. This allows lateral movement of the proximal end of the elongate member relative to the probe body. In other words, imparted axial motion (which includes motion that has an axial component) may partially or fully disengage or unseat the carrier member from the seat. This, in turn, allows lateral movement of the proximal end of the elongate member. In this manner, the elongate member maintains a well-defined rest position relative to the probe body until the movable joint is unseated by imparted axial motion of the elongate member relative to the probe body. Such axial displacement of the elongate member relative to the probe body may also be used to help absorb any so-called over-travel and can thus provide an over-deflection protection mechanism that prevents damage to the ultrasound probe when it is moved into contact with a surface.

Also described herein is a method is provided for the ultrasonic inspection of an object, the method comprising the steps of bringing an ultrasound inspection probe as described above into acoustic contact with the object to be inspected and coupling ultrasound into the object.

An inspection probe is thus described herein. The inspection probe may comprise an ultrasound inspection probe. The probe may include a probe body. The probe body may be suitable for mounting to a coordinate positioning apparatus. A member, for example an elongate member, may extend from the probe body. The elongate member may comprise a measurement transducer. The member may comprise a measurement transducer assembly. The measurement transducer may comprise an ultrasound transducer. The measurement transducer may comprise an alternative (non-ultrasound) sensor. The member may have a datum (reference) surface. The datum surface may be provided at the distal end of the member. A movable joint may be provided that connects the elongate member to the probe body. For example, a proximal end of the elongate member may be connected to the probe body by the movable joint. The movable joint may be configured to permit lateral movement of the proximal end of the elongate member relative to the probe body. The movable joint may be configured to permit rotational movement of the proximal end of the elongate member relative to the probe body. The motion allowed by the movable joint may be such that the elongate member can rotate about its distal end to allow the datum surface to angularly align with a surface of an object to be inspected. The inspection probe may include any one or more of the features described above.

Figure 2C:
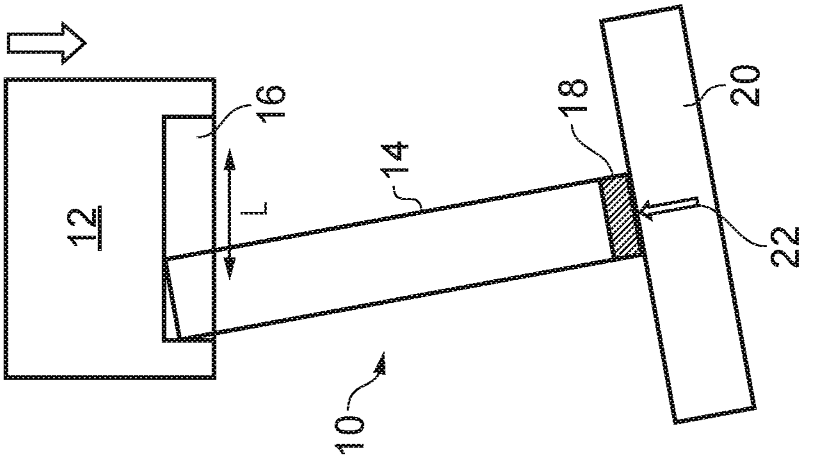
Figure 2B:
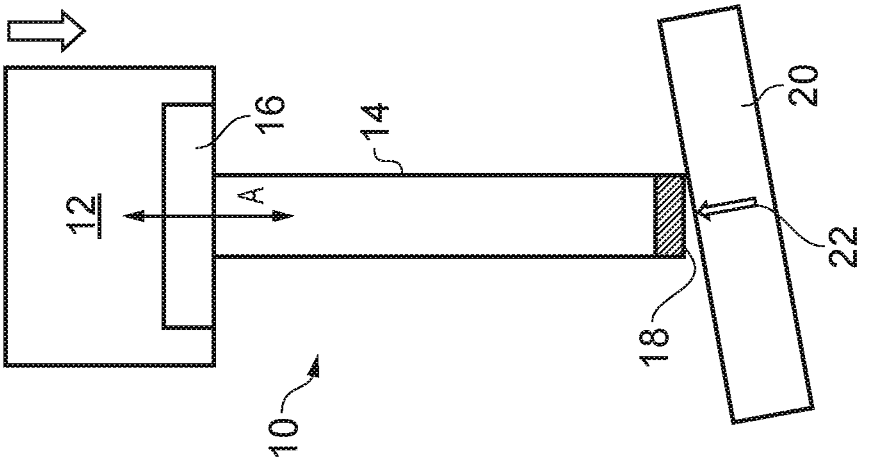
Figure 2A:
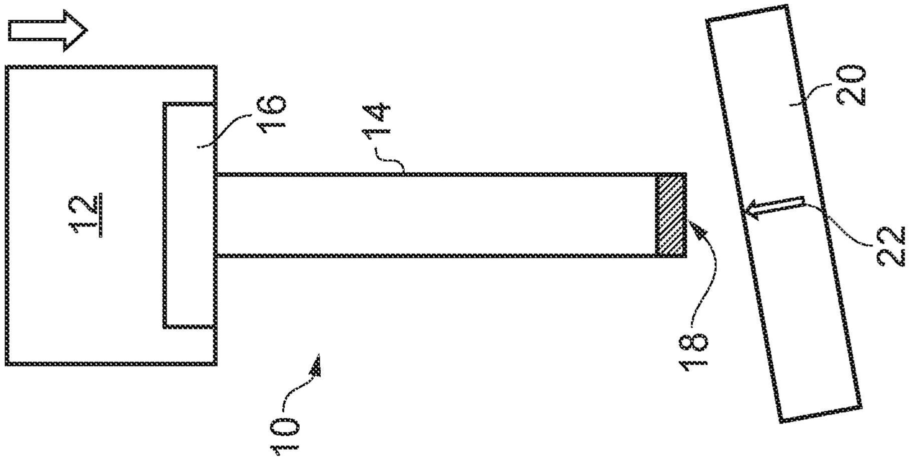
Figure 3A:
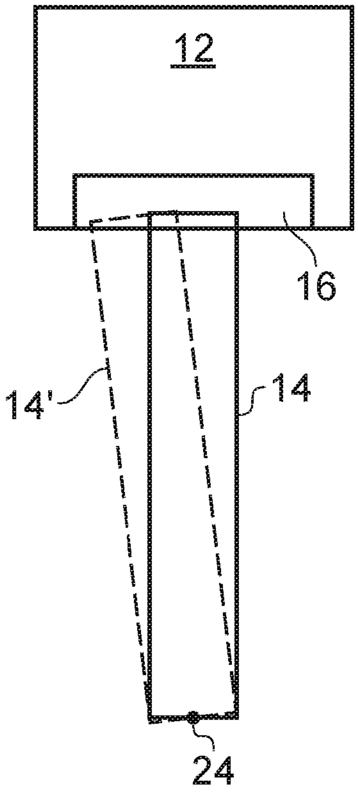
Figure 3B:
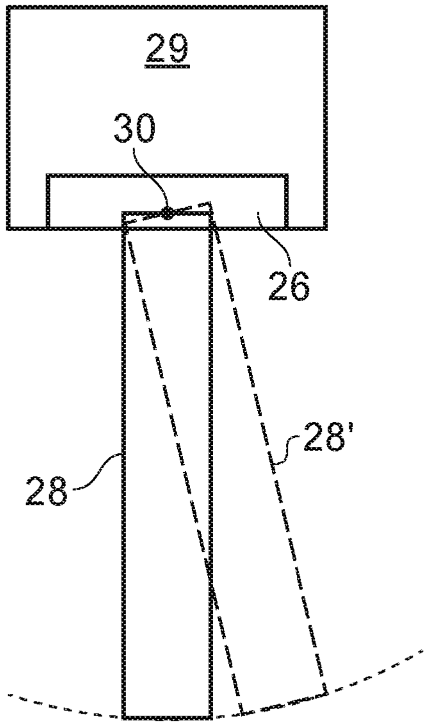
Figure 6:
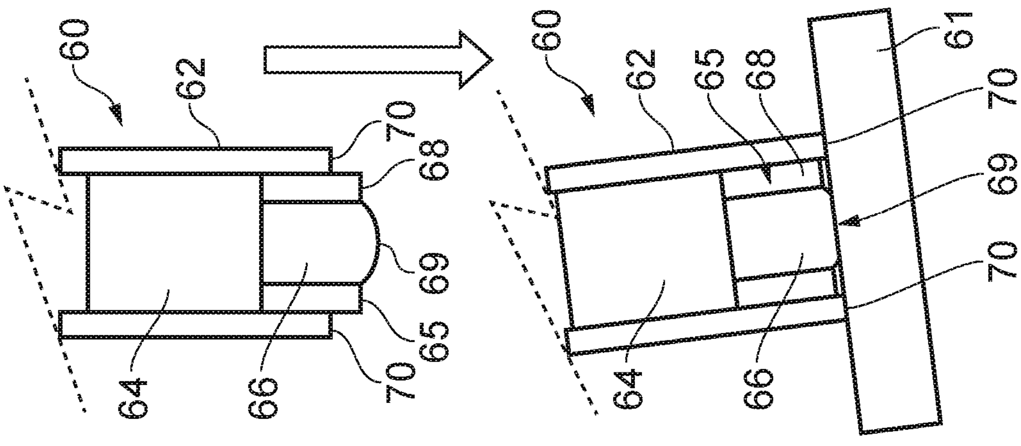
Figure 5:
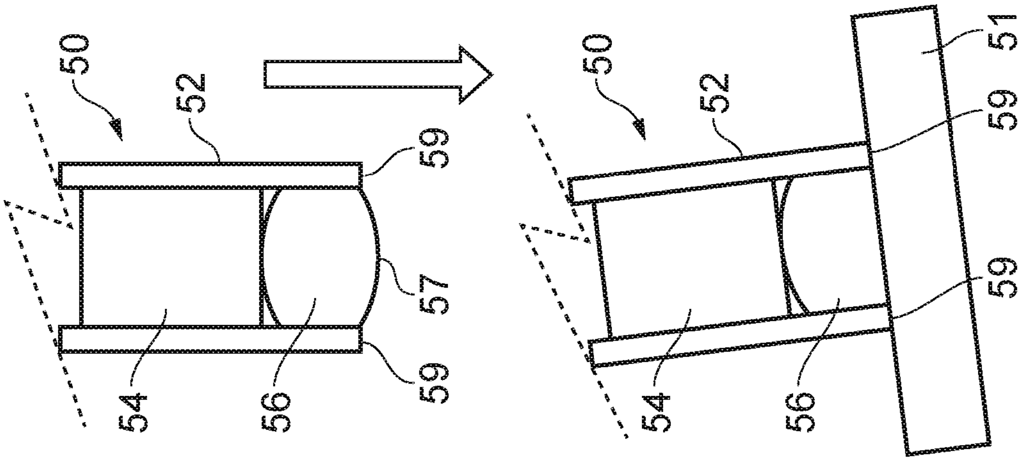
Figure 4:
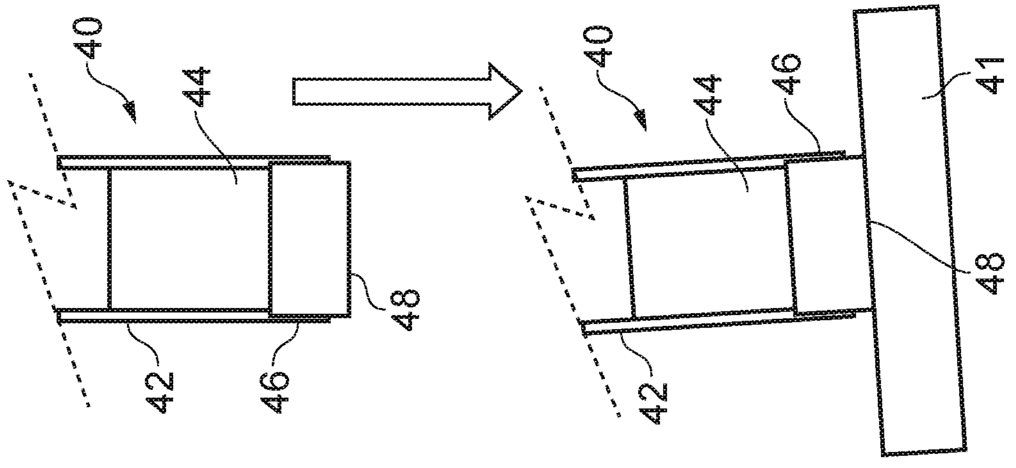
Figure 7B:
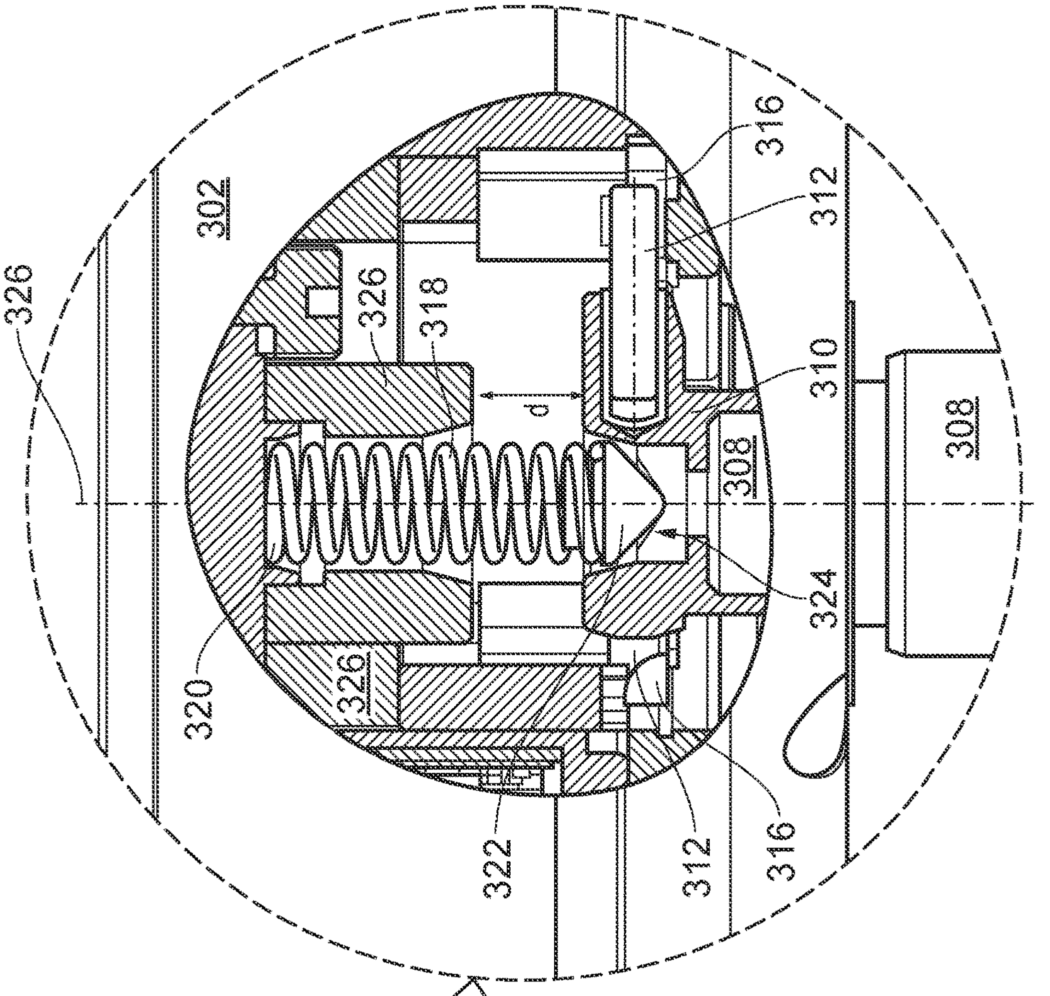
Figure 7A:
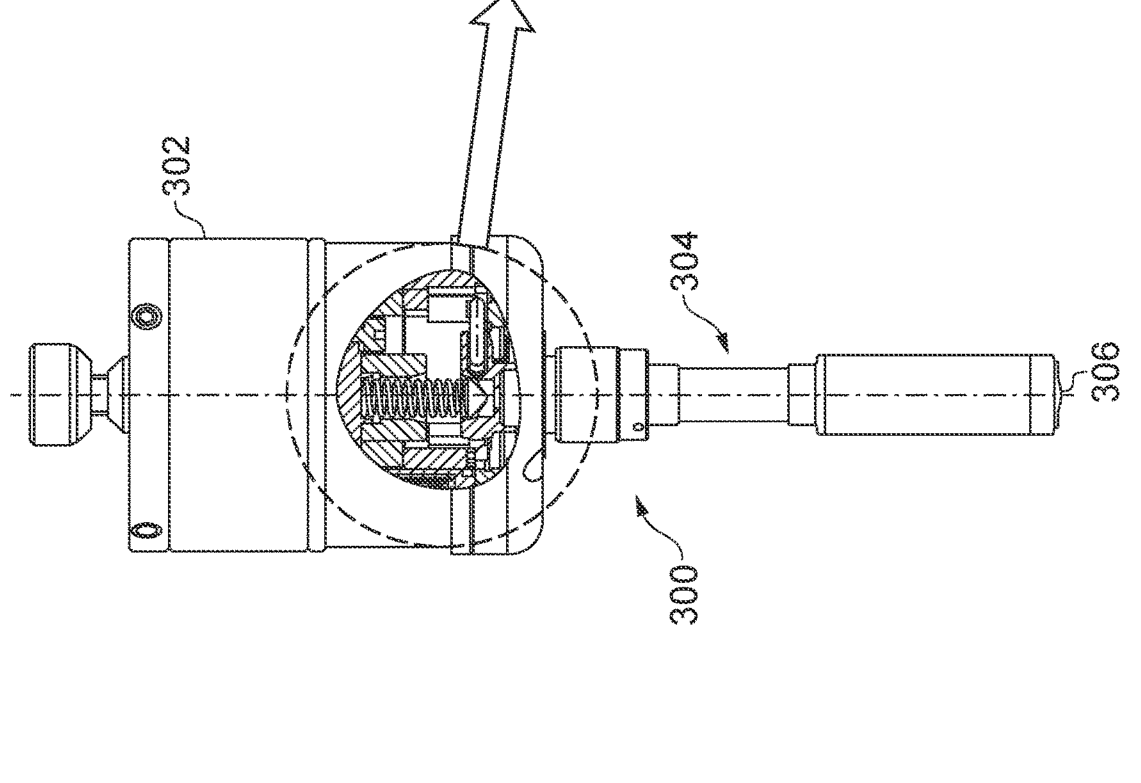
Figure 7D:
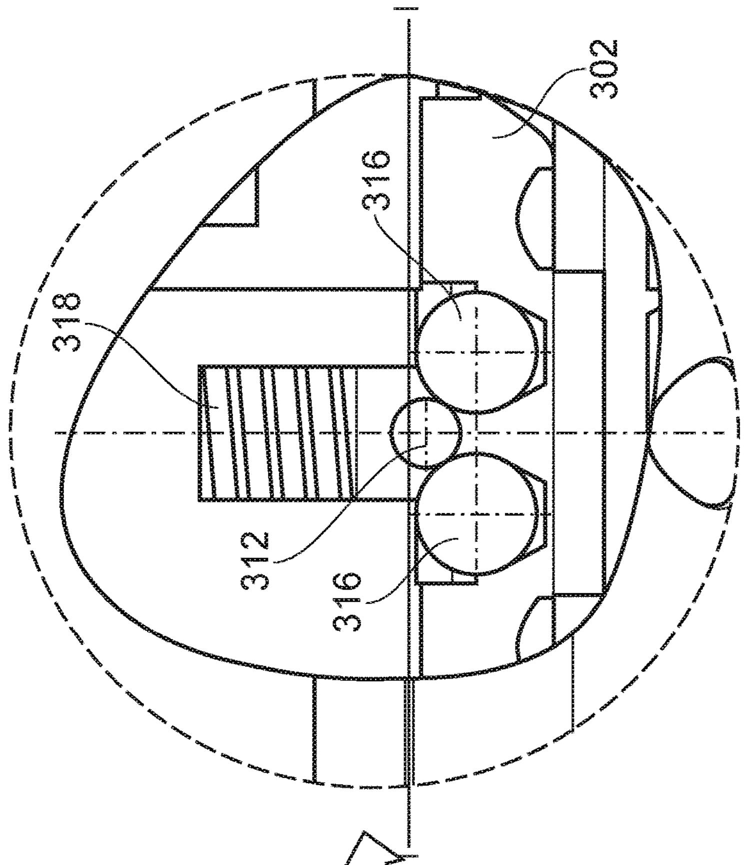
Figure 7C:
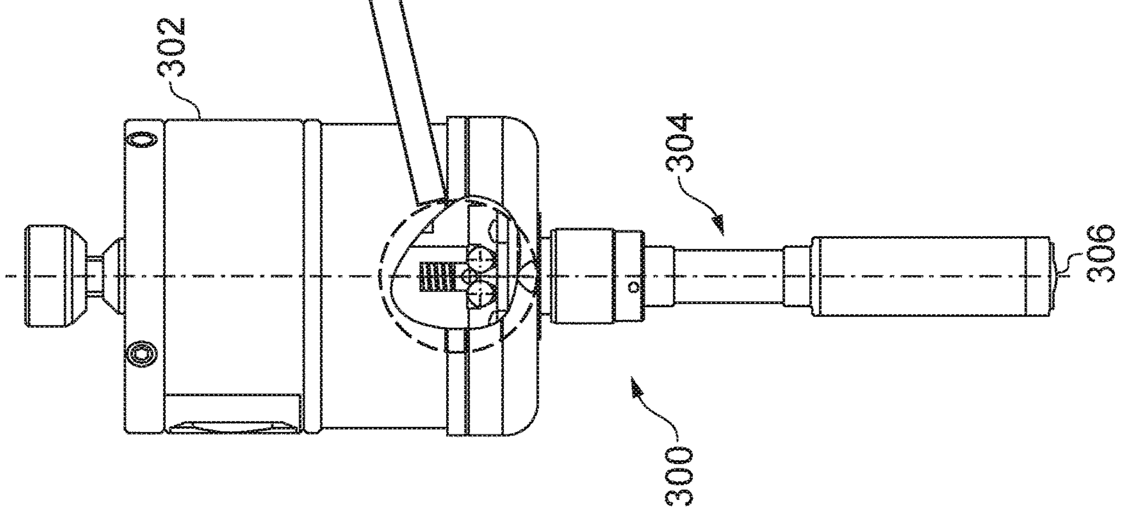
Figure 8:
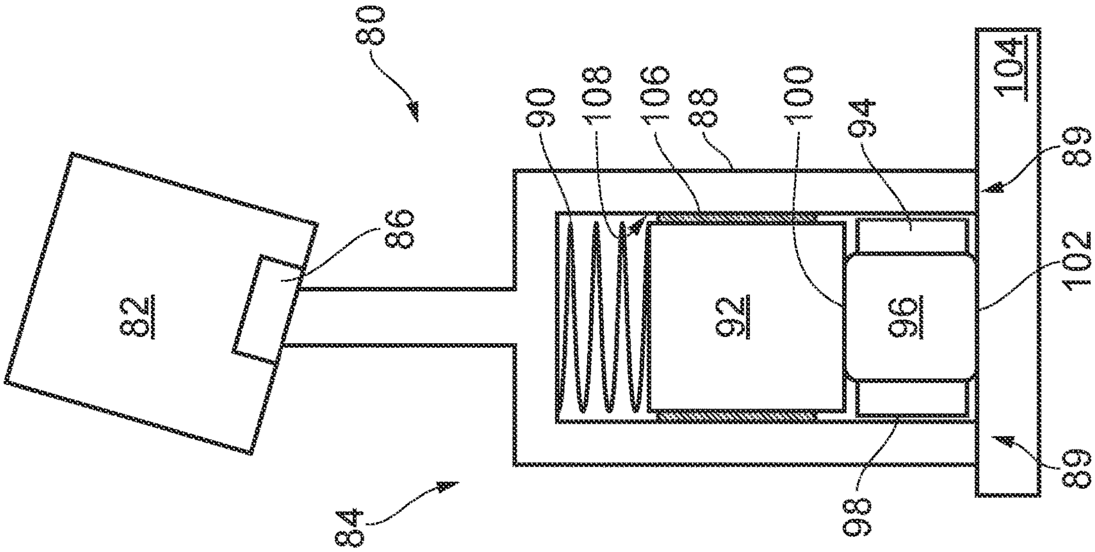
Figure 9A:
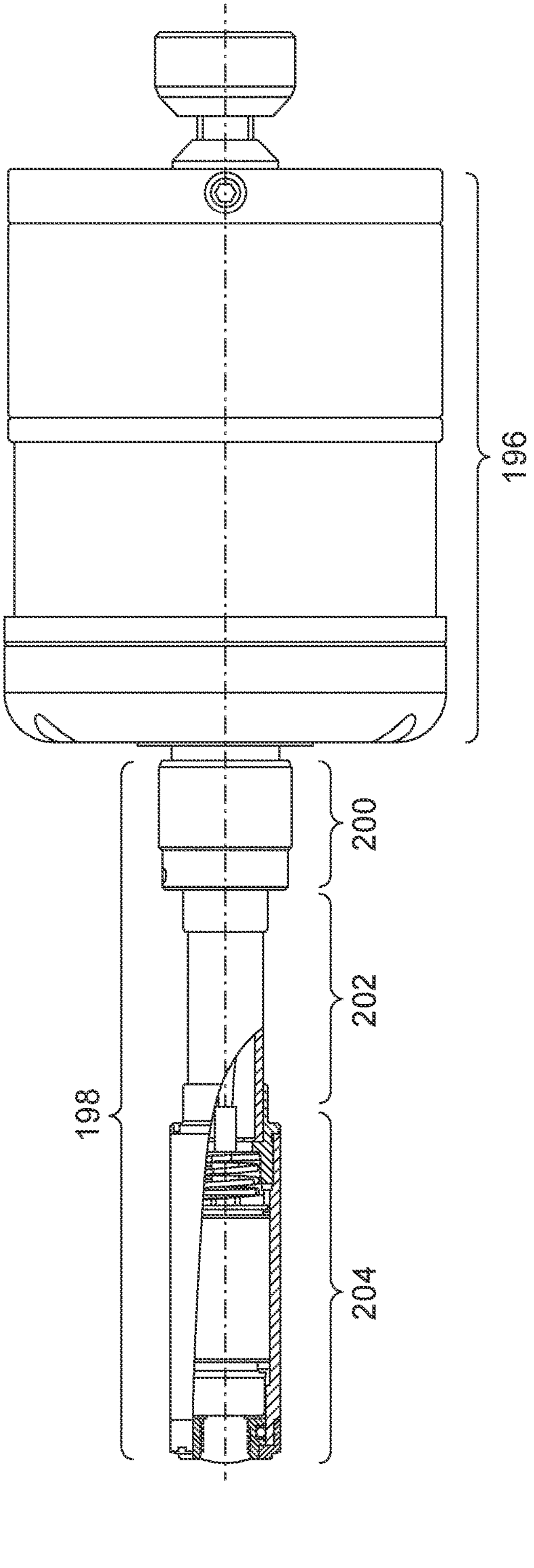
Figure 9B:
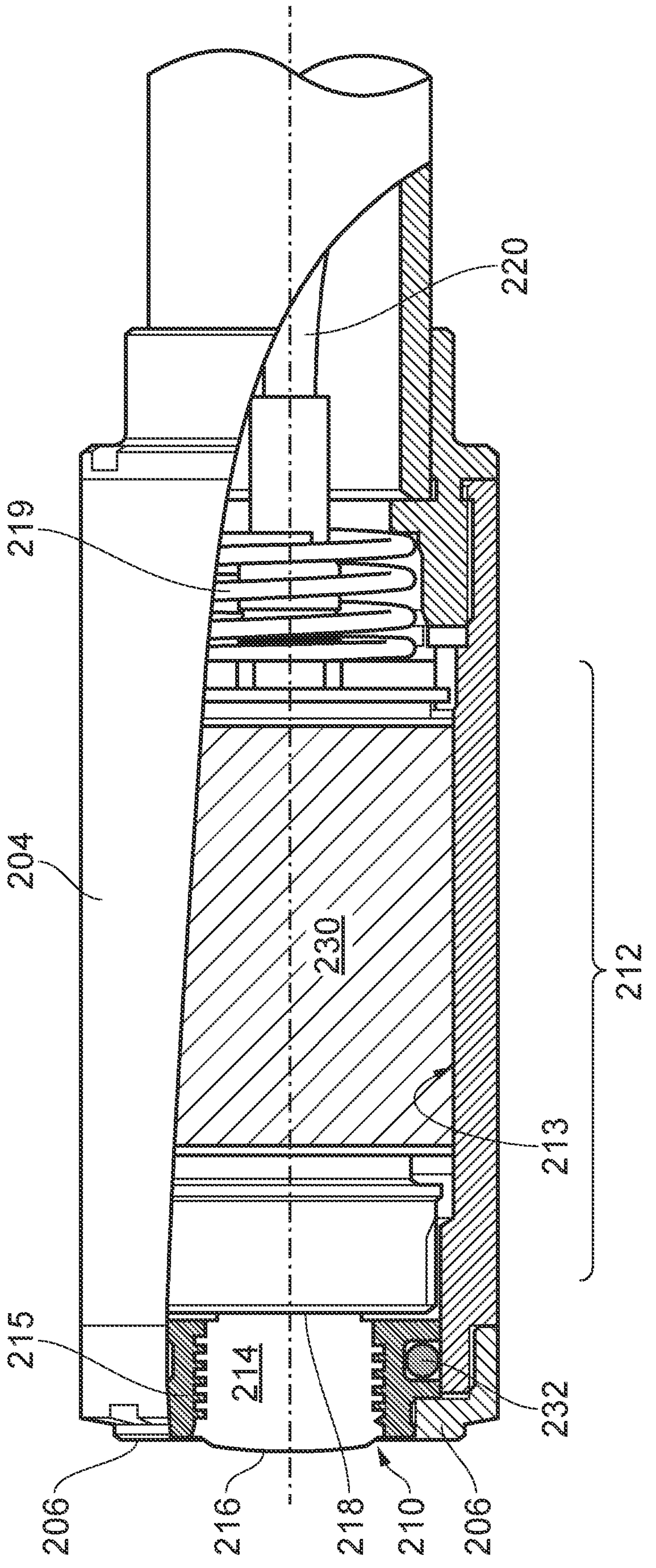

The present invention will now be described, by way of example only, with reference to the accompanying drawings in which:

FIG. 1 shows an ultrasound probe mounted to a spindle within a CNC machine tool, FIGS. 2*a* to 2*c* show a movable joint for an ultrasound probe that allows lateral movement of the proximal end of the elongate member, FIGS. 3*a* and 3*b* show the motion of the distal end of the elongate member with and without lateral motion at the movable joint, FIG. 4 shows an elongate member having a rigid delay line that provides a datum surface, FIG. 5 shows an elongate member having a datum surface formed by the distal end of a tubular member, FIG. 6 shows an elongate member having a datum surface formed by the distal end of a tubular member and a linearly translatable ultrasound transducer assembly, FIGS. 7*a* to 7*e* show in more detail a probe body attached to an elongate member by a kinematic, movable joint, FIG. 8 illustrates the linearly translatable transducer assembly arrangement of the elongate member, and FIGS. 9*a* and 9*b* provide more detailed illustrations of the linearly translatable transducer assembly.

Referring to FIG. 1, a machine tool is illustrated. The machine tool comprises an enclosure 2 that includes a spindle 4 that is movable relative to a bed 3. The spindle 4 can be moved relative to the bed 3 under the control of a computer numerical controller (CNC) 6. In order to cut or process an object 8 placed on the machine tool bed 3, the spindle can carry a cutting tool (not shown). A measurement sensor can also be mounted to the spindle 4 in place of a cutting tool to allow the object 8 to be measured before or after a cutting procedure. Typically, such measurement sensors and tools can be automatically loaded into the spindle 4 under the control of the CNC 6 to allow a desired sequence of cutting and measurement to be implemented. In FIG. 1, an ultrasound inspection probe 10 is shown mounted to the spindle 4. Measurement information is transmitted wirelessly (e.g., via an optical or radio link) to a probe interface 12 that forwards such measurements to the controller 6. As will be explained below, the ultrasound measurement probe 10 allows internal properties of the object 8 to be measured, such as the thickness of the object.

Although a machine tool is illustrated in FIG. 1, the ultrasound inspection probe of the present invention could also be configured for use with other coordinate positioning apparatus, such as coordinate measuring machines (CMMs), industrial inspection robots etc.

Referring to FIGS. 2*a*-2*c*, the ultrasound inspection probe 10 (or ultrasound probe 10 for short) is schematically illustrated. The ultrasound probe 10 comprises a probe body 12 that can be secured to the machine tool spindle 4 by a known mechanical attachment mechanism. An elongate member 14 extends from the probe body 12. The proximal end of the elongate member 14 is attached to the probe body 12 by a movable joint 16. The distal end or tip of the elongate member 14 comprises a datum surface 18. An ultrasound transducer assembly is also provided within the elongate member 14. Details of the ultrasound transducer assembly are not shown in FIGS. 2*a*-2*c* but are described in more detail below.

To collect an ultrasound measurement, the ultrasound probe 10 is moved along its longitudinal axis towards and into engagement with the surface of the object 20 being measured (i.e., downwards as shown in FIGS. 2*a*-2*c*). In this example, it is desired to measure the thickness of the object 20 beneath the point on the surface illustrated by the arrow 22.

As shown in FIG. 2*a*, the ultrasound probe 10 is initially moved towards the object 20 through free-space. The elongate member 14 is, in the absence of any external force, biased into a repeatable rest position relative to the probe body 12 by the movable joint 16.

FIG. 2*b* shows the elongate member 14 making initial contact with the object 20 which is at a slight angle relative to the ultrasound probe 10 (noting that the inclination angles etc are exaggerated in the drawings to aid understanding). As shown in FIG. 2*b*, the datum surface 18 is thus initially inclined at an oblique angle relative to the surface of the object 20 which would prevent good acoustic contact being established. The motion of the ultrasound probe 10 towards the object 20 has, however, also started to displace the elongate member 14 relative to the probe body 12 at the movable joint 16. In particular, there is axial movement of the elongate member 14 towards the probe body 12; i.e., movement of the elongate member along the elongate member's longitudinal axis as indicated by arrow A.

As shown in FIG. 2*c*, continued motion of the ultrasound probe 10 towards the object 20 causes additional axial movement at the movable joint 16. The movable joint 16 is, however, also configured to allow lateral movement (i.e., side-to-side motion as indicated by the arrow L) of the proximal end of the elongate member 14. This lateral movement at the movable joint 16 allows the datum surface 18 to tilt to align with the surface of the object 20 as the ultrasound probe 10 continues to move closer to the object 20. In effect, the lateral motion L permitted by the movable joint 16 allows the elongate member 14 to rotate or pivot about its distal end. The datum surface 18 will thus rotate and sit flat on the surface of the object 20 at the point (i.e., indicated by arrow 22) where the object 20 thickness is to be measured.

Referring to FIGS. 3*a* and 3*b*, the motion imparted by movable joints providing different amounts of lateral constraint is illustrated.

FIG. 3*a* is similar to FIG. 2*c* above and again shows the elongate member 14 connected to the probe body 12 by movable joint 16 that permits lateral motion. The elongate member 14 can thus tilt about the point 24 at its distal end, with the tilted elongate member 14' illustrated in dashed outline. It should be noted that tilting about the point 24 is not restricted to merely tilting in the plane shown in the drawings.

FIG. 3*b* illustrates an ultrasound probe having a movable joint 26, not in accordance with the present invention, where no significant lateral motion of the proximal end of the elongate member 28 relative to the probe body 29 is permitted. In other words, lateral motion of the proximal end of the elongate member 28 is constrained by the movable joint 26. The elongate member 28 is thus able to tilt about its proximal end (e.g., about pivot point 30) and such motion will cause the distal end of the elongate member 28 to move along the arc as shown by the dotted line 27 with a rotated elongate member 28' shown in dashed outline. The movable joint 26 will thus still allow the distal end of the elongate member 28 to change its orientation relative to the probe body 29, but this change in the angular orientation of the elongate member 28 requires lateral motion of the distal end of the elongate member 28 relative to the probe body 29.

If an ultrasound probe as shown in FIG. 3*b* was brought into contact with an object, the only way for the distal end of the elongate member 28 to reorientate to align to the surface would be for it to move laterally across the surface of the object. This lateral movement would occur as the elongate member was being moved into engagement with surface with increasing force and could thus potentially damage (e.g., scratch) the surface being inspected. Such surface damage would be highly undesirable for high value precision parts, such as turbine blades. Furthermore, lateral movement of the distal end of the elongate member 28 would alter the lateral position at which the object was measured. For example, a thickness measurement would be taken away from the desired measurement point on the object. This would lead to potential measurement errors, especially for objects (again such as turbine blades) that have large variations in thickness.

Referring next to FIGS. 4 to 6, various examples of the elongate member and ultrasound transducer assembly that could be included in the above-described ultrasound probe 10 will be described.

FIG. 4 shows the distal end of an elongate member 40 in free-space (top drawing) and when fully engaged with the surface of an object 41 to be measured (bottom drawing). The rest of the elongate member 40, the attached probe body and the movable joint are not shown. The elongate member 40 comprises a tubular sleeve 42. The ultrasound assembly comprises an ultrasound transducer 44 and a rigid ultrasound coupling element 46 that are mounted within the tubular sleeve 42. An object-contacting face 48 of the rigid ultrasound coupling element 46 extends distally beyond the tubular sleeve 42. In this example, the datum surface is provided by the face 48 of the rigid ultrasound coupling element 46 and the movable joint of the ultrasound probe (not shown) allows the elongate member 40 to rotate about its distal end so that the face 48 sits flat on the surface of the object 41. As explained above, application of an ultrasound coupling gel or the like is likely to be required to provide sufficient acoustic coupling between such an ultrasound probe and the object 41. It should be noted that the face of a more flexible (elastic) ultrasound coupling element could provide a datum surface, instead of the rigid ultrasound coupling element 46. For example, an ultrasound coupling element formed from an elastic material but surrounded or enclosed by a rigid carrier element that inhibits lateral expansion of the ultrasound coupling element could be provided.

FIG. 5 shows an alternative configuration of elongate member 50. Again, the top drawing shows the elongate member in free-space and the lower drawing shows the elongate member when engaged with an object 51 to be measured. The rest of the elongate member 50, the attached probe body and the movable joint are not shown. In this embodiment, the elongate member 50 comprises a tubular sleeve 52. The ultrasound assembly comprises an ultrasound transducer 54 secured within the tubular sleeve 52 and an elastically deformable (soft) carrier element 56 that has an object-contacting face 57 that (in free-space) protrudes beyond the distal end of the tubular sleeve 52. The annular end face 59 of the tubular sleeve 52 provides the datum surface which engages the object 51. The elongate member 50 rotates abouts its distal end (by virtue of the movable joint not illustrated in FIG. 5) when pushed into engagement with the object 51 so that the datum surface (i.e., the annular end face 59) angularly aligns with the object's surface. The elastically deformable (soft) carrier element 56 is sufficiently elastic to deform and compress such that it lies flush with the datum surface (i.e., the annular end face 59) when fully engaged with the object 51. Although not shown, an annular gap may be provided between the elastically deformable (soft) carrier element 56 and the surrounding tubular sleeve 52 to allow sufficient deformation of that carrier element 56.

FIG. 6 shows an elongate member 60 having a further alternative configuration. Again, the top drawing shows the elongate member in free-space and the lower drawing shows the elongate member when engaged with an object 61 to be measured. The rest of the elongate member 60, the attached probe body and the movable joint are not shown. The elongate member 60 comprises a tubular sleeve 62 and has an ultrasound assembly slidably mounted within the tubular sleeve 62. The ultrasound assembly comprises an ultrasound transducer 64 acoustically coupled to an ultrasound coupling assembly 65. The ultrasound coupling assembly 65 comprises an elastic ultrasound coupling element 66 partially contained within a tubular carrier shell 68. The ultrasound transducer 64 and ultrasound coupling assembly 65 are mounted by a bearing mechanism (not shown) to allow them to translate back and forth along a longitudinal axis of the tubular sleeve 62. A bias in the form of a compression spring (not shown) is also provided that, in the absence of an applied external force, urges the object-contacting face 69 of the elastic ultrasound coupling element 66 to extend distally beyond the annular end face 70 of the tubular sleeve 62. In the embodiment, the annular end face 70 of the tubular sleeve 62 provides the datum surface.

After the object-contacting face 69 engages the object, the ultrasound assembly translates within the tubular sleeve 62 until the object-contacting face 69 of the elastic ultrasound coupling element 66 lies flush with the datum surface of the annular end face 70. In addition, the elongate member 60 rotates abouts its distal end (by virtue of the movable joint not illustrated in FIG. 6) so that the datum surface (i.e., the annular end face 70) moves away from its repeatable rest position and angularly aligns with the object's surface. In this manner, reliable acoustic contact is provided with the object allowing ultrasound measurements to be collected. Further details of a mechanism of the type are provided below.

It should be noted that although it is preferred that the datum surface aligns with the object's surface prior to taking an ultrasound measurement, this is not always the best solution for certain (e.g., non-flat) surfaces. For example, for curved or uneven surfaces allowing the elongate member to self-align with the surface may cause ultrasound measurements to be collected from an unpredictable direction relative to the surface. In such a case, it may be preferable for the ultrasound measurements to be collected with the elongate member in its repeatable rest position. This may be achieved by sensing (e.g., using a deflection sensor as described below) when the elongate member contacts the surface to provide an approximate measurement of the position of a point on the surface of the object. The machine tool can then move (back-off) the ultrasound probe so that the elongate member loses contact with the surface of the object, whereby the elongate member returns to its repeatable rest position. A further movement of the ultrasound probe back towards the measurement point on the surface of the object may then be performed to re-engage the elongate member with the surface. However, the ultrasound probe may be positioned by the machine tool so that the elongate member is pressed into engagement with the object's surface with a sufficiently low force to prevent the elongate member moving away from its repeatable rest position. The orientation of the elongate member relative to the surface of the object is then known when ultrasound measurements are collected.

Figure 7E:
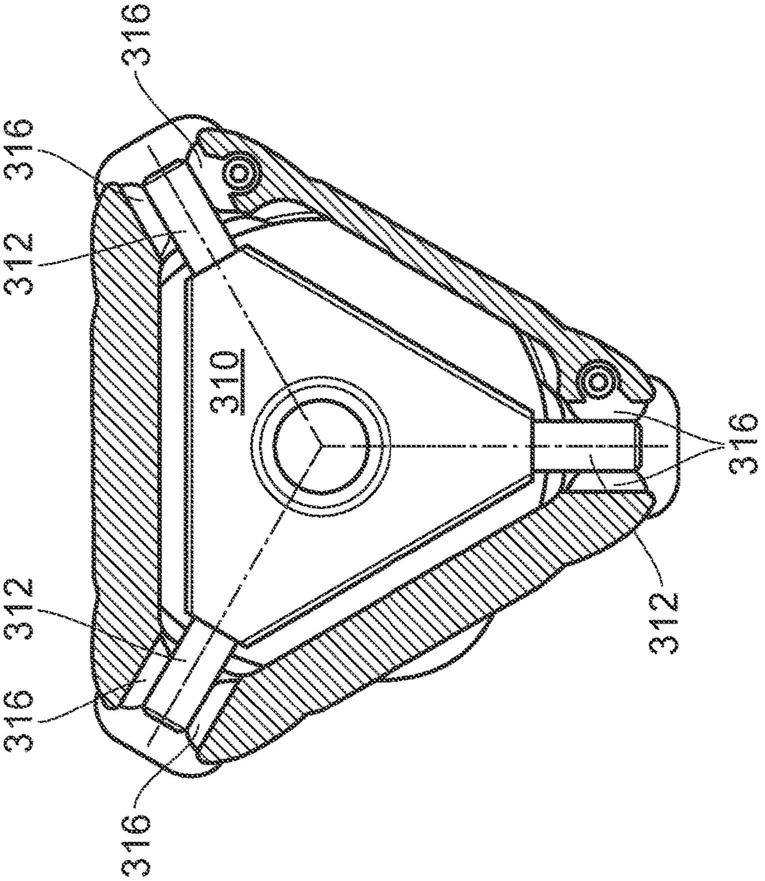

Referring to FIGS. 7*a* to 7*e*, there are shown various views of an ultrasound probe 300. FIG. 7*a* is a general view of the whole ultrasound probe 300 with a cut-out, provided as an expanded view in FIG. 7*b*, that shows the movable joint within the probe. FIG. 7*c* again shows a general view of the whole ultrasound probe 300 but with a different cut-out, provided as an expanded view in FIG. 7*d*, showing in more detail the ball and roller arrangement of the moveable joint. FIG. 7*e* show a section through the plane I-I of FIG. 7*d*.

The ultrasound probe 300 comprises a probe body 302 from which extends an elongate member 304. An ultrasound transducer assembly is provided within the elongate member. The object-contacting face 306 of the ultrasound coupling element of such an ultrasound transducer assembly can be seen at the distal end of the elongate member 304. The elongate member 304 is attached to the probe body 302 by a moveable joint housed within the probe body 302.

Referring to FIG. 7*b*, the elongate member 304 comprises a tubular sleeve 308 that is releasably attached at its distal end to a stylus holder 310 by a screw-thread attachment. As best seen in FIGS. 7*d* and 7*e*, the stylus holder 310 comprises three equidistantly spaced, radially extending rollers 312. The stylus holder 310 is thus an example of a carrier member that is located at the proximal end of the elongate member 304.

The probe body 302 contains three pairs of balls 316, which again can be best seen in FIGS. 7*d* and 7*e*. Each pair of balls 316 forms a cleft, as shown in FIG. 7*d*, for receiving one of the rollers 312 of the stylus holder 310. The three pairs of balls 316 are immovably fixed to the probe body 302 and thus form seats for the rollers 312 of the stylus holder 310. A compression spring 318 has a proximal end 320 affixed to a portion of the probe body 302. A conical element 322 is attached to the distal end of the compression spring 318. The compression spring 318 exerts a biasing force against a curved recess 324 that is provided as part of the stylus holder 310.

The biasing force exerted by the compression spring 318 against the stylus holder 310 (i.e., via the conical element 322 engagement with the curved recess 324) urges the rollers 312 of the stylus holder into engagement with the pairs of balls 316 that form the clefts for the rollers. In the absence of any externally applied force, the stylus holder 310 adopts a highly repeatable (kinematically defined) rest position relative to the seat of the probe body 302.

If the elongate member 304 engages an object, any tilting or axial motion (i.e., motion along the longitudinal axis 326) against the biasing force will cause one or more of the rollers 312 to disengage the associated pair of balls 316. This frees the stylus holder 310 from the positional constraint otherwise provided and allows angular and lateral motion of the stylus holder 310 relative to the probe body 302. In this manner, the elongate member 304 can align itself to the surface of the object to be inspected without the distal end of the elongate member having to move laterally across the surface of the object. The rollers 312 and balls 316 may also form part of series electrical circuit, so that disengagement of any one or more of the rollers from the associated pair of balls will break the circuit and thus provide a so-called trigger signal that can be used to indicate the elongate member 304 has been deflected due to contact with an object. In other words, the rollers 312 and balls 316 may form part of a deflection sensor for sensing deflection of the elongate member 304 relative to the probe body 302. This trigger signal may be used to measure the position of a point on the surface of the object and/or to halt motion of the machine tool that is carrying the ultrasound probe 300.

A guide channel element 326 is provided in the probe body adjacent the proximal (upper) end of the compression spring 318. This guide channel element 326 acts to stabilise or constrain the spring 318 (i.e., it limits the lateral motion of the upper part of the spring) to prevent uncontrolled deformation or buckling of the spring 318. This ensures the desired spring rate is maintained whilst ensuring the spring 318 does not restrict lateral motion of the stylus holder 310. The guide channel element 326 also acts as a limit or end-stop that prevents over-compression of the spring 318 (i.e., the stylus holder 310 can only move axially by the distance d before it engages the guide channel element 326).

Referring to FIG. 8, further details are provided of an ultrasound probe 80 comprising a linearly movable transducer assembly of the type mentioned above with reference to FIG. 6.

The ultrasound probe 80 comprises a probe body 82 and an elongate member 84 that extends from the probe body. The probe body 82 is attached to the elongate member 84 by a movable (deflectable) joint 86. The elongate member 84 comprises a tubular sleeve 88 in which are housed the various components that form the ultrasound assembly. The distal annular end face 89 of the tubular sleeve 88 provides the datum surface which engages the object to be inspected 104.

The ultrasound assembly comprises a compression spring 90, an ultrasound transducer 92 and an ultrasound coupling assembly 94. The ultrasound coupling assembly 94 comprises an elastic ultrasound coupling element 96 partially contained within an outer, tubular carrier shell 98. The carrier shell 98 is made from a substantially rigid material that prevents the elastic coupling element 96 from expanding radially (i.e., the elastic coupling element 96 is radially constrained by the carrier shell 98) but allows longitudinal expansion. A proximal (rear) face 100 of the elastic coupling element 96 protrudes from the proximal end of the carrier shell 98. The ultrasound transducer 92 is biased (pressed) into contact with the proximal (rear) face 100 of the elastic coupling element 96 by the compression spring 90. A distal (front) face 102 of the elastic coupling element 96 protrudes from the distal end of the tubular carrier shell 98. This distal (front) face 102 of the elastic coupling element 96 is configured to be pressed into contact with the object 104 to be measured.

The ultrasound transducer 92 and the ultrasound coupling assembly 94 are configured to move linearly (i.e., translate back and forth) within the tubular sleeve 88 of the elongate member. In particular, the ultrasound transducer 92 is partially encapsulated in a layer of hardened epoxy 106 that provides a bearing surface which slideably engages the inner surface 108 of the tubular sleeve 88. A sliding bearing is thus provided which guides the ultrasound transducer 92 back and forth along a linear axis.

The process for forming the sliding bearing that is illustrated in FIG. 8 includes the following steps. Firstly, the (inner) bearing surface 108 of the tubular sleeve 88 is coated with a wax release agent. The ultrasound transducer 92 is then held in the required location and orientation within the tubular sleeve 88. A two-part epoxy is injected into the space between the transducer 92 and the inner bearing surface 108 of the tubular sleeve 88 and the epoxy is and allowed to set. The transducer 92 and set epoxy are slid out of the tubular sleeve 88 and the wax is cleared off the (inner) bearing surface 108 of the tubular sleeve 88. The transducer 92 and attached (i.e., set or hardened) epoxy 106 are returned to the tubular sleeve 88 with appropriate lubrication, forming the high precision sliding (linear) bearing. A further sliding bearing arrangement is also provided to loosely linearly guide the ultrasound coupling assembly 94 within the tubular sleeve 88, but as explained below the accuracy of such guidance is less important.

The ultrasound coupling assembly 94 and particularly the transducer 92 can thus be aligned during manufacture so that the acoustic axis (i.e., the axis along which ultrasound is directed) is substantially perpendicular to the plane containing the annular datum surface 89. In other words, the acoustic axis can be aligned to be substantially parallel to the normal to the datum surface 89. This ensures that when the annular datum surface 89 engages the surface of an object the ultrasound will be directed into the object along the direction perpendicular to the surface.

The sliding bearing arrangement ensures that the ultrasound transducer 92 maintains a fixed orientation relative to the normal to the annular end face 89 (i.e., the datum surface) even when translated back and forth. In other words, a bearing mechanism is provided for constraining motion of the ultrasound transducer 92 to maintain a fixed transducer orientation relative to the normal to the annular datum surface 89. In particular, at least pitch and yaw of the ultrasound transducer 92 are substantially prevented.

In use, the ultrasound coupling assembly 94 is initially biased into its (fully) extended position by the compression spring 90 (noting that the mechanical stops that would define this fully extended position are not shown). In this configuration, the distal (front) face 102 of the elastic coupling element 96 extends beyond the annular datum (reference) surface 89. This configuration is adopted when the ultrasound measurement probe 80 is not in contact with an object to be inspected (e.g., when it is in free-space prior to measurement).

To acquire an ultrasound measurement, the ultrasound probe 80 is pressed into engagement with an object, as shown for object 104 in FIG. 8. As explained above, the movable joint 86 allows the elongate member 84 to rotate about its distal end so that the annular datum surface 89 sits flat on the object's surface. Furthermore, the action of bringing the annular ultrasound coupling assembly 94 into contact with the surface of the object 104 pushes the ultrasound coupling assembly 94 and transducer 92 backwards into the tubular sleeve 88 until the distal (front) face 102 of the elastic coupling element 96 is flush with the annular datum surface 89. In other words, the ultrasound coupling assembly 94 adopts a retracted (measurement) position in which the acoustic axis is substantially perpendicular to the surface of the object 104. Ultrasound is thus coupled into the object 104 in a direction orthogonal to its surface.

A particular advantage of this arrangement is that the force with which the distal (front) face 102 of the elastic coupling element 96 is pushed into the surface is governed by the strength of the bias provided by the compression spring 90. Furthermore, because the ultrasound transducer 92 is also pushed into contact with the proximal (rear) face 100 of the elastic coupling element 96 by the compression spring 90 the compressive force to which the elastic coupling element 96 is subjected is also controlled by the compression spring 90. This arrangement means that any expansion of the elastic coupling element 96, which must be linear (non-radial) expansion because of the tubular carrier shell 98, does not have a substantial effect on the compression force applied to the elastic coupling element 96 during measurement (i.e., when in the retracted/measurement position). This increases the repeatability between measurements, even if the elastic coupling element 96 swells significantly due to the absorption of coolant or the like.

Although an epoxy based linear bearing is described for guiding the ultrasound transducer, other sliding bearing arrangements could alternatively be used. For example, a linear ball-bearing. The arrangement may also allow adjustment of the orientation of the ultrasound transducer 92. For example, adjustments of the orientation of the acoustic axis of the transducer relative to the normal of the datum surface 89 may be possible after manufacture. For example, this could allow adjustments of the acoustic axis during a repair or recalibration procedure.

Referring next to FIGS. 9*a* and 9*b*, an ultrasound inspection probe is shown that includes a probe body 196 and an ultrasound stylus 198. FIG. 9*b* provides an expanded view of the distal end of the inspection probe of FIG. 9*a*.

The ultrasound stylus 198 comprises an elongate tubular structure that is formed from a first section 200, a second section 202 and a third section 204. The first section 200 comprises the proximal end of the stylus and includes a screw-threaded recess configured to attach the stylus 198 to a corresponding screw-threaded protrusion of the probe body 196. The second section 202 comprises a hollow tube that connects the first section 200 to the third section 204. The three sections 200, 202 and 204 are releasably connected to each other to allow easy disassembly, but they could alternatively be permanently bonded to each other. It would also be possible for the stylus to be formed as an integral (e.g., single piece) tubular structure. In other words, a modular or integral stylus may be provided.

An annular datum surface 206 provides the distal face of the third section 204 of the stylus. An ultrasound coupling assembly 210 and an ultrasound transducer 212 are slidably mounted within the third section 204 of the stylus 198. The sliding (linear) bearing of the ultrasound transducer 212 is provided by an epoxy layer 230 that slides against a corresponding inner surface 213 of the third section 204 of the stylus. The ultrasound coupling assembly 210 comprises an external O-ring 232 that slides against a corresponding inner surface of the third section 204 of the stylus. As described above, the ultrasound coupling assembly 210 comprises an ultrasound coupling element 214 that in this example comprises high-consistency rubber. The ultrasound coupling element 214 is radially constrained within a carrier shell 215 and has a dome-shaped object-contacting (front) face 216 that (in the absence of an external force) protrudes (extends) through the aperture defined by the annular datum surface 206. The ultrasound transducer 212 is biased into contact with a transducer-contacting (rear) face 218 of the ultrasound coupling element 214 by a spring 219. In use, the annular datum surface 206 engages the surface of the object and the object-contacting (front) face 216 of the ultrasound coupling assembly 210 will retract such that it lies flush with the annular datum surface 206. As explained above, the spring 219 controls the force applied to the ultrasound coupling element 214. A wire 220 passes through the stylus 198 from the ultrasound transducer 212 and to the probe body.

The stylus 198 is releasably attached to the probe body 196 via the screw thread connection provided by the screw-threaded recess and the corresponding screw-threaded protrusion. A deflectable stylus carrier of the probe body 196 is attached to the rest of the probe body by a movable joint that provides a deflection mechanism. Deflection of the stylus carrier relative to the casing of the probe body 196 is measured by an appropriate sensor. In this manner, deflection of the stylus 198 due to contact with the surface of an object can be sensed and may be used by the machine tool to stop motion of the ultrasound probe. Any over-travel of the ultrasound probe can also be absorbed by the deflection mechanism preventing damage to the stylus 198. The probe body 196 of this example also includes a processing unit, including a processor, for analysing the ultrasound signal and a wireless communications unit for transmitting ultrasound measurements to an associated probe interface. In this example, these are provided on one or more circuit boards located within the probe body 196.

It should be remembered that the above are only examples of the present invention. This skilled person would appreciate the various different ways in which the present invention could be implemented. For example, the probe body could include a protruding stem (e.g., having a similar cross-sectional profile to the elongate member) that carries the movable joint at its distal end. The elongate member can then be attached to the distal end of the stem. Such an arrangement is particularly useful for applications where part access is restricted, such as measuring bores. It would also be possible for the ultrasound inspection probe to include a plurality of movable joints (e.g., in series) and for elongate members of different lengths to be provided for different measurement applications.

The invention claimed is:

1. An ultrasound inspection probe, comprising;

a probe body for mounting to a coordinate positioning apparatus, an elongate member extending from the probe body, the elongate member comprising an ultrasound transducer assembly and a datum surface at its distal end, and a movable joint connecting a proximal end of the elongate member to the probe body, wherein the movable joint is configured to permit lateral and rotational movement of the proximal end of the elongate member relative to the probe body such that the elongate member can rotate about its distal end to allow the datum surface to angularly align with a surface of an object to be inspected, the movable joint comprises a carrier member, a seat and a biasing mechanism, the carrier member being provided at the proximal end of the elongate member and the probe body comprising the seat, the biasing mechanism urging the carrier member into engagement with the seat in the absence of an applied external force to thereby define a repeatable rest position of the elongate member relative to the probe body, and the movable joint is configured such that imparted axial movement of the elongate member relative to the probe body causes the carrier member to at least partially disengage the seat thereby allowing lateral movement of the proximal end of the elongate member relative to the probe body.

2. An ultrasound inspection probe according to claim 1, wherein the carrier member and the seat are configured to provide a kinematically defined rest position.

3. An ultrasound inspection probe according to claim 2, wherein the carrier member comprises three radially extending rollers and the seat comprises three pairs of balls, each pair of balls defining a cleft for receiving one of the rollers.

4. An ultrasound inspection probe according to claim 1, wherein the biassing mechanism comprises a compression spring.

5. An ultrasound inspection probe according to claim 4, wherein the compression spring engages the probe body and/or the carrier member via a conical member.

6. An ultrasound inspection probe according to claim 4, wherein the probe body comprises a guide channel and the compression spring is at least partially located within the guide channel.

7. An ultrasound inspection probe according to claim 1, wherein the movable joint allows at least 1 mm of lateral motion of the proximal end of the elongate member.

8. An ultrasound inspection probe according to claim 1, wherein the elongate member comprises a tubular sleeve that houses the ultrasound transducer assembly, wherein the distal end of the tubular sleeve provides the datum surface and the ultrasound transducer assembly comprises an ultrasound transducer and an elastically deformable ultrasound coupling element for acoustically coupling to the object to be inspected.

9. An ultrasound inspection probe according to claim 8, wherein the ultrasound transducer assembly is mounted within the tubular sleeve by a bearing mechanism, the bearing mechanism being configured to guide the ultrasound transducer assembly back and forth along a linear axis of the elongate member such that the ultrasound transducer maintains a substantially invariant orientation relative to the surface normal of the datum surface.

10. An ultrasound inspection probe according to claim 1, wherein the ultrasound transducer assembly comprises an ultrasound transducer and a rigid coupling element for acoustically coupling the ultrasound transducer to an object to be inspected, the distal end of the rigid coupling element providing the datum surface of the elongate member.

11. An ultrasound inspection probe according to claim 1, further comprising a deflection sensor to sense deflection of the elongate member relative to the probe body.

12. An ultrasound inspection probe according to claim 1 configured for use on a machine tool, wherein the ultrasound inspection probe is substantially sealed against an ingress of coolant or cutting debris and comprises a wireless communications portion for wireless communication of acquired ultrasound measurements to a remote probe interface.

13. A method for the ultrasonic inspection of an object, the method comprising the steps of using a machine tool to move an ultrasound inspection probe according to claim 1 into acoustic contact with the object to be inspected and coupling ultrasound into the object.

14. A method according to claim 13, wherein the ultrasound inspection probe comprises a deflection sensor to sense deflection of the elongate member relative to the probe body, the method comprising the steps of;

(i) using the deflection sensor to sense physical contact of the elongate member with the surface of the object to be inspected, and (ii) using the physical contact detected in step (i) to initiate ultrasound measurements of the object using the ultrasound inspection probe.

15. A method according to claim 14, where the machine tool is programmed to move the ultrasound inspection probe towards and/or away from the object between steps (i) and (ii) to establish acoustic contact for ultrasound measurement of the object.

* * * * *